United States Patent
Dejneka et al.

(10) Patent No.: US 11,629,091 B2
(45) Date of Patent: Apr. 18, 2023

(54) TRANSPARENT, NEAR INFRARED-SHIELDING GLASS CERAMIC

(71) Applicant: CORNING INCORPORATED, Corning, NY (US)

(72) Inventors: Matthew John Dejneka, Corning, NY (US); Jesse Kohl, Horseheads, NY (US); Mallanagouda Dyamanagouda Patil, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/539,507

(22) Filed: Dec. 1, 2021

(65) Prior Publication Data

US 2022/0089472 A1  Mar. 24, 2022

Related U.S. Application Data

(63) Continuation of application No. 16/559,806, filed on Sep. 4, 2019, now Pat. No. 11,214,511, which is a continuation of application No. 15/244,534, filed on Aug. 23, 2016, now abandoned.

(60) Provisional application No. 62/351,616, filed on Jun. 17, 2016, provisional application No. 62/352,602, filed on Jun. 21, 2016.

(51) Int. Cl.
| | |
|---|---|
| C03C 3/091 | (2006.01) |
| C03C 4/08 | (2006.01) |
| C03C 10/00 | (2006.01) |
| C03C 3/15 | (2006.01) |
| C03C 4/06 | (2006.01) |
| C03C 3/12 | (2006.01) |
| G02B 5/20 | (2006.01) |
| C03C 3/089 | (2006.01) |
| C03C 4/18 | (2006.01) |
| C03C 21/00 | (2006.01) |

(52) U.S. Cl.
CPC ............. *C03C 3/091* (2013.01); *C03C 3/122* (2013.01); *C03C 3/15* (2013.01); *C03C 4/065* (2013.01); *C03C 4/082* (2013.01); *C03C 4/085* (2013.01); *C03C 10/0009* (2013.01); *G02B 5/208* (2013.01); *C03C 3/089* (2013.01); *C03C 4/18* (2013.01); *C03C 10/0018* (2013.01); *C03C 10/0027* (2013.01); *C03C 10/0054* (2013.01); *C03C 21/002* (2013.01); *C03C 2204/00* (2013.01)

(58) Field of Classification Search
CPC ..... C03C 3/091; C03C 4/082; C03C 10/0018; C03C 10/0027
See application file for complete search history.

(56) References Cited

U.S. PATENT DOCUMENTS

| | | | |
|---|---|---|---|
| 2,034,994 A | 3/1936 | Ellsworth et al. | |
| 2,952,575 A | 9/1960 | Baltzer | |
| 3,293,052 A | 12/1966 | Sawchuk et al. | |
| 3,457,106 A | 7/1969 | Gillery | |
| 3,499,775 A | 3/1970 | Albinak et al. | |
| 3,582,370 A | 6/1971 | Beall | |
| 3,779,733 A | 12/1973 | Janakirama | |
| 3,785,834 A | 1/1974 | Rapp | |
| 3,985,534 A | 10/1976 | Flannery et al. | |
| 4,009,042 A | 2/1977 | Rittler | |
| 4,303,298 A | 12/1981 | Yamashita | |
| 4,537,862 A | 8/1985 | Francel et al. | |
| 4,769,347 A | 9/1988 | Cook et al. | |
| 4,792,536 A | 12/1988 | Pecoraro et al. | |
| 4,870,539 A | 9/1989 | Chance et al. | |
| 5,304,516 A | 4/1994 | Clifford | |
| 5,393,593 A | 2/1995 | Gulotta et al. | |
| 5,468,694 A | 11/1995 | Taguchi et al. | |
| 5,565,388 A | 10/1996 | Krumwiede et al. | |
| 5,566,428 A | 10/1996 | Takahashi | |
| 5,668,066 A | 9/1997 | Oguma et al. | |
| 6,048,621 A | 4/2000 | Gallego et al. | |
| 6,114,264 A | 9/2000 | Krumwiede et al. | |
| 6,184,162 B1 | 2/2001 | Speit et al. | |
| 6,196,027 B1 | 3/2001 | Varanasi et al. | |
| 6,214,429 B1 | 4/2001 | Zou et al. | |
| 6,274,523 B1 | 8/2001 | Krumwiede et al. | |

(Continued)

FOREIGN PATENT DOCUMENTS

| | | |
|---|---|---|
| AU | 2003214255 A1 | 12/2003 |
| CA | 1232619 A | 2/1988 |

(Continued)

OTHER PUBLICATIONS

Matthew J. Dejneka; Transparent Oxyfluoride Glass Ceramics; MRS Bulletin; Nov. 1998; pp. 57-62; https:/www.cambridge.org/core.

Moon et al; "Near Infrared Shielding Properties of Quaternary Tungsten Bronze Nanopartice NAO.11CSO.22WO3"; Bull. Korean Chem. Soc. vol. 34, No. 3(2013); pp. 731-734.

Moore et al. "Microstructural evolution of conductive WTi phosphate glass-ceramics" GOMD, Madison, WI. May 26, 2016. 18 slides.

(Continued)

*Primary Examiner* — Elizabeth A. Bolden
(74) *Attorney, Agent, or Firm* — Russell S. Magaziner

(57) ABSTRACT

Optically transparent glass ceramic materials comprising a glass phase containing and a crystalline tungsten bronze phase comprising nanoparticles and having the formula $M_xWO_3$, where M includes at least one H, Li, Na, K, Rb, Cs, Ca, Sr, Ba, Zn, Cu, Ag, Sn, Cd, In, Tl, Pb, Bi, Th, La, Pr, Nd, Sm, Eu, Gd, Dy, Ho, Er, Tm, Yb, Lu, and U, and where $0<x<1$. Aluminosilicate and zinc-bismuth-borate glasses comprising at least one of $Sm_2O_3$, $Pr_2O_3$, and $Er_2O_3$ are also provided.

14 Claims, 10 Drawing Sheets

(56) References Cited

U.S. PATENT DOCUMENTS

| | | |
|---|---|---|
| 6,376,399 B1 | 4/2002 | Aitken et al. |
| 6,537,937 B1 | 3/2003 | Nishizawa et al. |
| 6,899,954 B2 | 5/2005 | Kolberg et al. |
| 6,911,254 B2 | 6/2005 | Fisher et al. |
| 7,192,897 B2 | 3/2007 | Yamane et al. |
| 7,365,036 B2 | 4/2008 | Miyazaki et al. |
| 7,517,822 B2 | 4/2009 | Fechner et al. |
| 7,727,916 B2 | 6/2010 | Peuchert et al. |
| 7,795,164 B2 | 9/2010 | Ritzberger et al. |
| 7,820,575 B2 | 10/2010 | Nagashima et al. |
| 7,838,451 B2 | 11/2010 | Nishizawa et al. |
| 7,851,394 B2 | 12/2010 | Ellison |
| 8,017,538 B2 | 9/2011 | Teyssedre et al. |
| 8,141,387 B2 | 3/2012 | Letz et al. |
| 8,263,509 B2 | 9/2012 | Hoppe et al. |
| 8,268,202 B2 | 9/2012 | Mamak et al. |
| 8,399,547 B2 | 3/2013 | Meyer et al. |
| 10,246,371 B1 | 4/2019 | Dejneka et al. |
| 10,370,291 B2 | 8/2019 | Dejneka et al. |
| 10,450,220 B2 | 10/2019 | Dejneka et al. |
| 10,807,906 B2 | 10/2020 | Dejneka et al. |
| 2002/0032113 A1 | 3/2002 | Nakajima et al. |
| 2002/0072461 A1 | 6/2002 | Akimoto et al. |
| 2002/0080474 A1 | 6/2002 | Ohishi et al. |
| 2003/0158029 A1 | 8/2003 | Clasen et al. |
| 2005/0151116 A1 | 7/2005 | Fechner et al. |
| 2005/0181927 A1 | 8/2005 | Hasegawa et al. |
| 2006/0025298 A1 | 2/2006 | Emlemdi |
| 2006/0063009 A1 | 3/2006 | Naitou et al. |
| 2007/0158317 A1 | 7/2007 | Brix et al. |
| 2007/0213195 A1 | 9/2007 | Hikata et al. |
| 2007/0225144 A1 | 9/2007 | Miyazaki et al. |
| 2008/0128923 A1* | 6/2008 | Saito ............... H01L 23/291 501/63 |
| 2008/0193686 A1 | 8/2008 | Loergen et al. |
| 2009/0035341 A1 | 2/2009 | Wagener et al. |
| 2009/0109654 A1 | 4/2009 | Fechner et al. |
| 2009/0113936 A1 | 5/2009 | Ritzberger et al. |
| 2009/0215605 A1 | 8/2009 | Letz et al. |
| 2009/0325349 A1* | 12/2009 | Hashimoto ............ C03C 3/105 501/65 |
| 2011/0028298 A1 | 2/2011 | Hoppe et al. |
| 2011/0248225 A1 | 10/2011 | Mamak et al. |
| 2012/0247525 A1 | 10/2012 | Aitken et al. |
| 2014/0232030 A1 | 8/2014 | Ritzberger et al. |
| 2014/0256865 A1 | 9/2014 | Boulton et al. |
| 2014/0305929 A1 | 10/2014 | Weiss et al. |
| 2015/0093554 A1 | 4/2015 | Estinto et al. |
| 2016/0168023 A1 | 6/2016 | Baum et al. |
| 2017/0362119 A1 | 12/2017 | Dejneka et al. |
| 2018/0044224 A1 | 2/2018 | Peng et al. |
| 2019/0168023 A1 | 6/2019 | Eltorai |
| 2019/0177212 A1 | 6/2019 | Dejneka et al. |

FOREIGN PATENT DOCUMENTS

| | | |
|---|---|---|
| CN | 1275542 A | 12/2000 |
| CN | 1424988 A | 6/2003 |
| CN | 1653007 A | 8/2005 |
| CN | 1286753 C | 11/2006 |
| CN | 103864313 A | 6/2014 |
| CN | 103930087 A | 7/2014 |
| CN | 104445932 A | 3/2015 |
| CN | 104743882 A | 7/2015 |
| CN | 104944471 A | 9/2015 |
| CN | 105102389 A | 11/2015 |
| CN | 105254181 A | 1/2016 |
| CN | 105948513 A | 9/2016 |
| CN | 106396413 A | 2/2017 |
| CN | 107124879 A | 9/2017 |
| CN | 107223116 A | 9/2017 |
| CN | 107601853 A | 1/2018 |
| CN | 109311730 A | 2/2019 |
| DE | 3514749 A1 | 10/1985 |
| DE | 10353756 A1 | 6/2005 |
| DE | 102005051387 B3 | 1/2007 |
| EP | 1780182 A1 | 5/2007 |
| EP | 1940341 A2 | 7/2008 |
| EP | 2360220 A1 | 8/2011 |
| EP | 2581353 A1 | 4/2013 |
| EP | 2805829 A1 | 11/2014 |
| EP | 3442914 A1 | 2/2019 |
| FR | 2563515 A1 | 10/1985 |
| GB | 2158062 A | 11/1985 |
| IT | 1181882 B | 9/1987 |
| JP | 53-085813 A | 7/1978 |
| JP | 60-235742 A | 11/1985 |
| JP | 63-242946 A | 10/1988 |
| JP | 05-270859 A | 10/1993 |
| JP | 09-241035 A | 9/1997 |
| JP | 2002-293571 A | 10/2002 |
| JP | 2003-099913 A | 4/2003 |
| JP | 2004-091308 A | 3/2004 |
| JP | 2004-206741 A | 7/2004 |
| JP | 2005-320225 A | 11/2005 |
| JP | 2007-238353 A | 9/2007 |
| JP | 2011-046599 A | 3/2011 |
| JP | 2011-256081 A | 12/2011 |
| JP | 5034272 B2 | 9/2012 |
| JP | 2014-094879 A | 5/2014 |
| JP | 2015-044921 A | 3/2015 |
| JP | 6206736 B2 | 10/2017 |
| JP | 2019-517987 A | 6/2019 |
| KR | 10-2005-0025182 A | 3/2005 |
| MX | 170104 B | 8/1993 |
| RU | 2032633 C1 | 4/1995 |
| RU | 2194807 C2 | 12/2002 |
| RU | 2531958 C2 | 10/2014 |
| SU | 392016 A1 | 7/1973 |
| TW | 264422 B | 12/1995 |
| TW | 200744975 A | 12/2007 |
| TW | 201630838 A | 9/2016 |
| WO | 99/02461 A1 | 1/1999 |
| WO | 2003/097544 A1 | 11/2003 |
| WO | 2007/048670 A2 | 5/2007 |
| WO | 2017/129516 A1 | 8/2017 |
| WO | 2017/218859 A1 | 12/2017 |
| WO | 2019/051408 A2 | 3/2019 |
| WO | 2019/083937 A2 | 5/2019 |
| WO | 2019/113029 A1 | 6/2019 |
| WO | 2019/118488 A1 | 6/2019 |
| WO | 2019/118493 A1 | 6/2019 |

OTHER PUBLICATIONS

Poirier et al; "Redox Behavior of Molybdenum and Tungsten in Phosphate Glasses"; J. Phys. Chem. B.; 112; (2008); pp. 4481-4487.
Pricing; Metal Bulletin Historical Tungsten Pricing (Annual Mean Averages), https://knoema.com/UNCTADFMCP2015Feb/free-market-commodity-prices-july-20- 16?tsld=1001760, Nov. 2016, 2 pages.
Profita et al; "What You Need to Know About Heavy Metals Pollution in Portland"; OPB; 13 Pages (2016) http://www.opb.org/news/article/what-you-need-to-know-about-heavy-metals--pollution-in-portland/.
Rouhani, "Photochromism of Molybdenum Oxude", National University of Singapore, PhD Thesis, NUS Graduate School for Integrative Sciences and Enginnering, 2013; 139 Pages.
Russian Patent Application No. 2019101015, Decision to Grant dated Mar. 16, 2021, 13 pages (6 pages of English Translation and 7 pages of Original Document); Russian Patent Office.
Saflex.RTM. SG Solar Absorbing PVB, Advanced Interlayer Technology for Laminated Glass; 2015; 2 Pages; https://www.saflex.com/pdf/en/Al-Arch-009a_Saflex_SG_Solar_A4.pdf.
Saint-Gobain Thermocontrol Venus; Copyright 2013; 1 Page; http://saint-gobain-autover.com/thermocontrol-venus-for-auto-glass.
Sakka; "Formation of Tungsten Bronze and Other Electrically Conducting Crystals by Crystallization of Glasses Containing Alkali and Tungsten Oxide", Bull. Inst. Chem. ReES, Kyoto Univ., 48 [4-5], 185 (1970).
Sayed et al., "Some properties of sodium tungsten bronzes as a function of sodium concentration", Indian Journal of Chem. Tech., vol. 12, May 2005, pp. 304-308.

(56) References Cited

OTHER PUBLICATIONS

Solar Energy Spectrum; 1 Page; Date Unknown; https://www.saflex.com/pdf/en/sseriesproductbrochure.pdf.

Song et al; "Hydrophilic Molybdenum Oxide Nanomaterials With Controlled Morphology and Strong Plasmonic Absorption OFR Photothermal Ablation of Cancer Cells"; ACS Appl. Mater. Interfaces, 6; (2014); pp. 3915-3922.

Spectaris; "Exemption Renewal Reqeust Form"; 29 Pages; Date Unknown; 1. http://rohs.exemptions.oeko.info/fileadmin/user_upload/RoHS_Pack_7/Exemption_13b/Spectaris_Exemption_Renewal_Request_13b_Final.pdf.

Status of US. federal trademark registration for the "GL-20" word mark, filed on Aug. 28, 1996, abandoned as of Aug. 30, 1998.

Taiwanese Patent Application No. 106120158, Office Action dated Mar. 31, 2021, 5 pages (English Translation Only); Taiwanese Patent Office.

Tetchi Fabrice Achille et al. "contribution to light transmittance modelling in starch media" African Journal of Biotechnology; Mar. 5, 2007; pp. 569-575; 6(5.

Vitro "Radio and Microwave Frequency Attenuation in Glass", Vitro Glass Technical Document TD-151,Vitro Architectural Glass, Oct. 4, 2016, 5 pages. Found at https://www.vitroglazings.com/media/1lk3zcc/vitro-td-151.pdf.(Year: 2016).

Wakeham et al; "Investigation of Tin-Based Alternatives for Cadmium in Optoelectronic Thin-Film Materials", Appl. Optics, 47, [13], May 2008, 8 pages.

Window Technologies: Low-E Coatings. Effucient Windows Collaborative, <www.efficientwindows.org/lowe.php> retrieved on Dec. 22, 2015.

X. Zeng, Y. Zhou, S. Ji, H. Luo, H. Yao, X. Huang, and P. Jin, "The preparation of a high performance near-infrared shielding CsxWO3/SiO2 composite resin coating and research on its optical stability under ultraviolet illumination", J. Mater. Chem. C, 3, 8050 (2015).

Yijie Zhou, et al.; CsxWO3 nanoparticle-based organic polymer transparent foils: low haze, high near infrared-shielding ability and excellent photochromic stability; Journal of Materials Chemistry C; 2017; pp. 6251-6258; vol. 5; Royal Society of Chemistry.

Zhou et al. "CsxWO3 nanoparticle-based organic polymer transparent foils: low haze, high near-infrared sheilding bility and excellent photocromic stability" Journal of Materials Chemistry 5, C, 2017, pp. 6251-6258.

"How Low-E Glass Works: What is Low-E Glass." PPG Glass Education Center, Available at: http://www.educationcenter.ppg.com/glasstopics/how_lowe_works.aspx> > retrieved on Dec. 22, 2015, 7 pages.

"Low-e Glass Blending Natural Views with Solar Efficiency." Ideascapes Class, Coatings, Paint. N.p., n.d. Web. <www.ppgideascapes.com/Glass/Products/Low-E-Glass.aspx>. Retrieved on Dec. 22, 2015.

"Sunroof" Wikipedia;; Available online at: https://en.wikipedia.org/wiki/Sunroof., Last Updated Nov. 9, 2017 6 Pages.

"Window Technologies: Low-E Coatings." Efficient Windows Collaborative, <www.efficientwindows.org/lowe.php> retrieved on Dec. 22, 2015.

Adachi et al; "Chromatic Instabilities in Cesium-Doped Tungsten Bronze Nanoparticles"; Journal of Applied Physics, 114; (2013) pp. 194304-1-194304-11.

Aitken and Youngman, "Structure-property relationships of WAI and WTi phosphate glasses and their corresponding glass-ceramics" XI BrazGlass, Curitiba, Brazil. Jul. 15, 2017. 30 slides.

Aitken et al. "Structure-property relationships of WAI and WTi phosphate glass", NCM-13, Halifax, NS, Canada. Jul. 26, 2016. 25 slides.

Alizadeh et al; "Study of Bulk Crystallization in MgO—CaO—SiO2—Na2O Glasses in the Prescence of CaF2 and MoO3 Nucleant"; Journal of Materials Science 38 (2003); pp. 1529-1534.

Austin Lott, Motortrend; From Coupes to Wagons, Some Cars Less Than $50,000 Have an Extra-Large Sunroof; Apr. 21, 2015; 20 pages, https://web.archive.org/web/20200806224129/https://www.motortrend.com/news/vehicles-offering-panoramic-sunroofs-for-less-than-50000/.

Australian Patent Application No. 2017285323, Examination Report No. 1 dated Feb. 11, 2021, 9 pages; Australian Patent Office.

Australian Patent Application No. 2017285323, Notice of acceptance for patent application dated Oct. 14, 2021, 3 pages English Translation only, Australian Patent Office.

Automotive Sunroof Market Size Forcast to Reach USO 9.76 Billion by 2022; Published Mar. 24, 2016; Global Market Insights, Inc. 3 Pages; https://www.gminsights.com/pressrelease/automotive-sunroof-market-report.

Banlaw; Molybdenum Prices and Molybdenum Price Charts; IPCC; http://www.infomine.com/investmenl/metal-prices/molybdenum-oxide/.

Beall and Duke, "Transparent glass ceramics", Journal of Materials Science 4 (1969), pp. 340-352.

Bodnar et al; "Formation and Optical Properties Of CuInSe2 Nanocrystals in a Silicate Matrix", Inorganic Materials, vol. 40, No. 8, 2004, pp. 797801. Translated From Neorganicheskie Materialy, vol. 40, No. 8, 2004, pp. 915920.

Chen et al; "Preparation and Near-Infrared Photothermal Conversion Property of Cesium Ungsten Oxide Nanoparticles"; Nanoscale Research Letters, 8; 57; (2013); 8 Pages.

Chinese Patent Application No. 201780037677.4, Office Action dated Mar. 1, 2021, 7 pages (English Translation Only); Chinese Patent Office.

Dejneka, "Transparent oxyflouride glass ceramics" MRS Bulliten, Nov. 1998, pp. 57-62.

Dickens et al; "The Tungsten Bronzes and Related Compounds", J. Amer. Chem. Soc., 81, 5556 (1981).

Dutta et al. "In-situ characterization of conductive W—Ti Phosphate Glass-Ceramics" GOMD Conference, 2016, Madison, WI. 17 slides.

Ecoflo; "What are the RCRA 9 Metals?"; Downloaded Jan. 10, 2019; 3 Pages; https://www.ecoflo.com/2014/12/19/what-are-the-rcra-8-metals/.

Efficient Window Collaborative; Window Technologies: (Technologies. PHP) Low-E Coatings; Copyright 2000-2018; 8 Pages, no date.

European Patent Application No. 18871435.6, European Search Report dated Jul. 6, 2021; 8 pages; European Patent Office.

F. Shi, J. Liu, X. Dong, Q. Xu, J. Luo, H. Ma, "Hydrothermal Synthesis of CsxWO3 and the Effects of N2 annealing on its Microstructure and Heat Shielding Properties", J. Mater. Sci. Technol., 30 [4], 342 (2014).

G.H. Beall, D.A. Duke; Transparent Glass-Ceramics; Journal of Materials Science; (1969); pp. 340-352; vol. 4.

Gabuni et al; "A Study of the Process of Doping High-Aluminium-Ferruginous Glasses With Small Additions of Some Oxides"; Thesis. Leningrad, 1963; 4 Pages.

Gabuniya et al; "Study of the Process of Alloying High-Content Aluminum-Iron Glass With Small Admixtures of Various Oxides"; Ministry for the Construction Materials Industry of the Georgian SSR Scientific and Technical Association "Gruzniistrom" Tbilisi Scientific Research Institute for Construction Material; Issue IX; (1975), 7 Pages.

Green et al; "Optical Properties of Lithium Tungsten Bronze Thin Films"; Journal of Applied Physics; 74; (1993); p. 3451-3458.

Guo et al; "Highly Efficient Ablation of Metastatic Breast Cancer Using Ammonium-Tungsten-Bronze Nanocube as a Novel 1064 NM-Laser-Driven Photothermal Agent"; Biomaterials; 52 (2015) pp. 407-416.

H. Miyazaki; Fabrication of uv-opaque and visible-transparent composite film; Solar Energy Materials & Solar Cells; (2006); pp. 2640-2646; vol. 90; Elsevier.

H. Tawarayama, F. Utsuno, H. Inoue, H. Hosono, and H. Kawazoe, "Coloration and Decoloration of Tungsten Phosphate Glasses by Heat Treatments at the Temperature Far below Tg", Chem. Mater. 18, 2810 (2006), 7 pages.

http://cars.axlegeeks.com/d/x/Panorama-Sunroof.

http://www.wsj.com/articles/SB10001424127887324024004578173271481039256.

Hussain; "Optical and Electrochromic Properties of Annealed Lithium-Molybdenum-Bronze Thin Films"; Journal of Electronic Materials; vol. 31, No. 6, (2002) pp. 615-630.

(56) References Cited

OTHER PUBLICATIONS

International Preliminary Report on Patentability of the International Searching Authority; PCT/US2017/037809; dated Dec. 27, 2018; 11 Pages; European Patent Office.

International Preliminary Report on Patentability of the International Searching Authority; PCT/US2018/057009; dated May 7, 2020; 10 Pages; Korean Intellectual Property Office.

International Search Report and Written Opinion of the International Searching Authority; PCT/US2017/037809; dated Oct. 18, 2017; 14 Pages; European Patent Office.

International Search Report and Written Opinion of the International Searching Authority; PCT/US2018/057009; dated May 22, 2019; 12 Pages; Korean Intellectual Property Office.

International Searching Authority Invitation to Pay Additional Fees PCT/US2017/037809 Dated Aug. 25, 2017.

Japanese Patent Application No. 2018-565799, Office Action dated Apr. 8, 2021, 6 pages (3 pages of English Translation and 3 pages of Original Document); Japanese Patent Office.

Kaliyev, "What Are Tungsten Bronzes", EIR vol. 20, No. 17, Apr. 30, 1993, 2 Pages.

Kamel et al; "Effect of the Ce Content on a Nuclear Waste Glassy Matrix in the System $SiO_2$—$Al_2O_3$—CaO—MgO—$ZrO_2$—$TiO_2$, Synthesized at a Low Melting Temperature"; Journal of Materials Science and Engineering, A; 3 (4) (2013) pp. 209-223.

Kawamoto et al; "Effects of Crystallization on Thermal Properties and Chemical Durability of the Glasses Containing Simulated High Level Radioactive Wastes"; Bull. Governm.Ind.Res.Inst.Osaka, 1978, vol. 29, No. 2, p. 168.

Kim et al; "Near Infrared Cut-Off Characteristics of Various Perovskite-Based Composite Films"; IPCBEE, vol. 43 (2012); pp. 40-43.

Knoche et al; "Melt Densities for Leucogranites and Granitic Pegmatites: Partial Molar Volumes for $SiO_2$, $Al_2O_3$, $Na_2O$, $K_2O$, $Li_2O$, $Rb_2O$, $Cs_2O$, MgO, CaO, SrO, BaO, $B_2O_3$, $P_2O_5$, $F_2O_{-1}$, $TiO_2$, $Nb_2O_5$, $Ta_2O_5$, and $WO_3$"; Geochimica Et Cosmochimica ACTA, vol. 59, No. 22 (1995) p. 4645-4652.

Korean Patent Application No. 10-2019-7001381, Office Action, dated Feb. 7, 2022, 15 pages (8 pages of English Translation and 7 pages of Original Document), Korean Patent Office.

L. Brickwedel, J. E. Shelby, "Formation and properties of sodium tungsten borate glasses", Phys. Chem. Glasses: Eur. J. Glass Sci. Technol. B, 5. 598 (2006).

Lee et al; "A Study on Toughened Glass Used for Vehicles and Its Testing Methods"; 8 Pages; Date Unknown; http://www-esv.nhtsa.dot.gov/Proceedings/24/files/24ESV-000152.pdf.

M. Green and Z. Hussain, "Optical properties of dilute hydrogen tungsten bronze thin films", J. Appl. Phys. 74, 3451 (1993).

M. von Dirke, S. Muller, K. Barner, and H. Rager "Cluster formation of $WO_3$ in $Li_2B_4O_7$ glasses". J. Non Crys. Sol, 124,265 (1990).

Japanese Patent Application No. 2021-096347, Office Action, dated Jul. 27, 2022, 08 pages (4 pages of English Translation and 4 pages of Original Copy); Japanese Patent Office.

Korean Patent Application No. 10-2019-7001381, Korean Office Action, dated Aug. 8, 2022, 4 pages (2 pages of English Translation and 2 pages of Original Copy); Korean Patent Office.

* cited by examiner

TRANSPARENT, NEAR INFRARED-SHIELDING GLASS CERAMIC

This application is a continuation of U.S. application Ser. No. 16/559,806 filed Sep. 4, 2019, which is a continuation of U.S. application Ser. No. 15/244,534 filed Aug. 23, 2016, which claims priority to U.S. Application Nos. 62/351,616 filed Jun. 17, 2016 and 62/352,602 filed Jun. 21, 2016, each of which is incorporated by reference herein in its entirety.

BACKGROUND

The disclosure relates to glass ceramic materials. More particularly, the disclosure relates to optically transparent glass ceramic materials. Even more particularly, the disclosure relates to optically transparent glass ceramic materials having a crystalline tungsten bronze phase.

Near infrared (NIR)-shielding glasses are being developed to block and/or eliminate wavelengths ranging from 700-2500 nm for applications ranging from optical filters, lenses, and glazing for medical, defense, aerospace, and consumer applications.

Low emittance (low-E) coatings have been developed to minimize the amount of ultraviolet and infrared light that can pass through glass without compromising the amount of visible light that is transmitted. Low-E coatings are typically either sputtered or pyrolytic coatings. Alternatively, low-E plastic laminates may be retrofitted to a glass substrate.

Thin films, coatings, and composite materials containing nano- or micron-sized particles of non-stoichiometric tungsten suboxides or doped non-stoichiometric tungsten trioxides (referred to as tungsten bronzes) have been used to provide near infrared shielding with high transparency in the visible spectrum. However, tungsten bronze films often require expensive vacuum deposition chambers, have limited mechanical robustness, and are susceptible to oxygen, moisture, and UV light, all of which cause the NIR shielding performance of these materials to decrease and to discolor and degrade transparency in the visible light range.

SUMMARY

The present disclosure provides optically transparent glass ceramic materials which, in some embodiments, comprise a glass phase containing at least about 80% silica by weight and a crystalline tungsten bronze phase having the formula $M_xWO_3$, where M includes, but is not limited to, at least one of H, Li, Na, K, Rb, Cs, Ca, Sr, Ba, Zn, Cu, Ag, Sn, Cd, In, Tl, Pb, Bi, Th, La, Pr, Nd, Sm, Eu, Gd, Dy, Ho, Er, Tm, Yb, Lu, and U, and where $0<x<1$. The crystalline tungsten bronze phase comprises nanoparticles. The glass ceramic, in some embodiments, has a low coefficient of thermal expansion (CTE), strong attenuation or blocking of ultraviolet (UV) radiation at wavelengths of less than about 360 nm and near infrared (NIR) radiation at wavelengths ranging from about 700 nm to about 3000 nm. Aluminosilicate and zinc-bismuth-borate glasses comprising at least one of $Sm_2O_3$, $Pr_2O_3$, and $Er_2O_3$ are also provided.

Accordingly, one aspect of the disclosure is to provide a glass ceramic comprising a silicate glass phase and from about 1 mol % to about 10 mol % of a crystalline $M_xWO_3$ phase comprising nanoparticles, where M is at least one of H, Li, Na, K, Rb, Cs, Ca, Sr, Ba, Zn, Cu, Ag, Sn, Cd, In, Tl, Pb, Bi, Th, La, Pr, Nd, Sm, Eu, Gd, Dy, Ho, Er, Tm, Yb, Lu, and U, and where $0<x<1$.

A second aspect of the disclosure is to provide a glass ceramic comprising a silicate glass phase and from about 1 mol % to about 10 mol % of a crystalline $M_xWO_3$ phase comprising nanoparticles, where M is at least one alkali metal, and $0<x<1$.

In another aspect an aluminosilicate glass comprising $SiO_2$, $Al_2O_3$, and at least one of $Sm_2O_3$, $Pr_2O_3$, and $Er_2O_3$, where $Sm_2O_3+Pr_2O_3+Er_2O_3 \leq 30$ mol %, is also provided. The aluminosilicate glass, in some embodiments, comprises from about 8 mol % to about 45 mol % $Al_2O_3$, from about 40 mol % to about 72 mol % $SiO_2$ and at least one of $Sm_2O_3$, $Pr_2O_3$, and $Er_2O_3$, wherein $Sm_2O_3+Pr_2O_3+Er_2O_{3<30}$ mol %. In some embodiments, the aluminosilicate glass further comprises at least one alkaline earth oxide and $B_2O_3$. The glasses, in some embodiments, have less than about 30% transmission at a wavelength between about 1400 nm and about 1600 nm.

In yet another aspect, a zinc-bismuth-borate glass comprising ZnO, $Bi_2O_3$, $B_2O_3$, and at least one of $Sm_2O_3$, $Pr_2O_3$, and $Er_2O_3$, where $Sm_2O_3+Pr_2O_3+Er_2O_3 \leq 12$ mol %. In some embodiments, the Zn—Bi-borate glasses further comprise at least one of $Na_2O$ and $TeO_2$. These glasses, in some embodiments, have less than about 30% transmission at a wavelength between about 1400 nm and about 1600 nm.

In another aspect, a phosphate glass comprising at least one rare earth oxide $Ln_2O_3$ and having a molar ratio $25Ln_2O_3:75P_2O_5$, where $Ln_2O_3$ comprises at least one of $Sm_2O_3$, $Pr_2O_3$, and $Er_2O_3$ is provided. In some embodiments the phosphate glass comprises: from about 6 mol % to about 25% $Ln_2O_3$; from about 5 mol % to about 27% $Al_2O_3$; and from about 67 mol % to about 74 mol % $P_2O_5$.

These and other aspects, advantages, and salient features will become apparent from the following detailed description, the accompanying drawings, and the appended claims.

DETAILED DESCRIPTION

Figure 1:
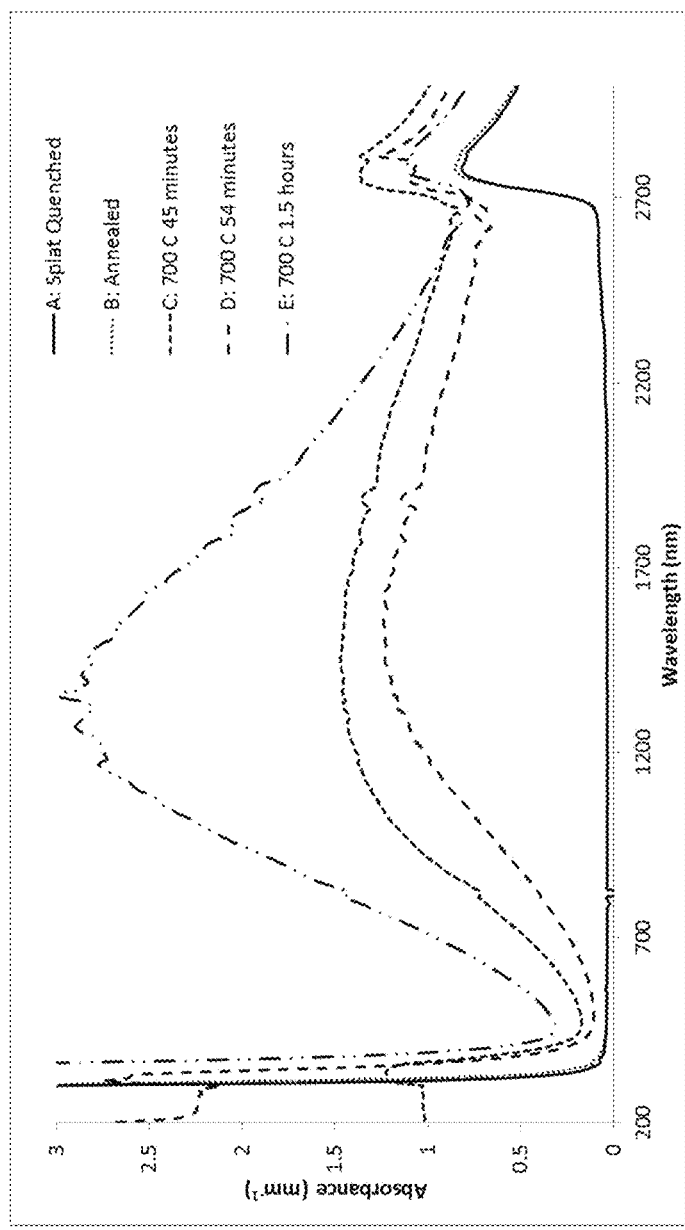
FIG. 1 is a plot of absorbance vs. wavelength of splat-quenched, annealed, and heat-treated glass ceramic samples.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass and/or glass ceramics, and includes laminates of the glasses and glass ceramics described herein with conventional glasses. Unless otherwise specified, all compositions are expressed in terms of mole percent (mol %). Coefficients of thermal expansion (CTE) are expressed in terms of $10^{-7}/°$ C. and represent a value measured over a temperature range from about 20° C. to about 300° C., unless otherwise specified.

As used herein, the terms "nanoparticle" and "nanoparticles" refer to particles between about 1 and about 1,000 nanometers (nm) in size. As used herein, the terms "platelet" and "platelets" refer to flat or planar crystals. As used herein, the terms "nanorod" and "nanorods" refer to elongated crystals having a length of up to about 1,000 nm and an aspect ratio (length/width) of at least 3 and in some embodiments, in a range from about 3 to about 5.

As used herein, "transmission" and "transmittance" refer to external transmission or transmittance, which takes absorption, scattering and reflection into consideration. Fresnel reflection is not subtracted out of the transmission and transmittance values reported herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of MgO" is one in which MgO is not actively added or batched into the glass, but may be present in very small amounts (e.g., less than 400 parts per million (ppm), or less than 300 ppm) as a contaminant.

Compressive stress and depth of layer are measured using those means known in the art. Such means include, but are not limited to, measurement of surface stress (FSM) using commercially available instruments such as the FSM-6000, manufactured by Orihara Co., Ltd. (Tokyo, Japan). Surface stress measurements rely upon the accurate measurement of the stress optical coefficient (SOC), which is related to the birefringence of the glass. SOC in turn is measured according to a modified version (hereinafter "the modification") of Procedure C, which is described in ASTM standard C770-98 (2013), entitled "Standard Test Method for Measurement of Glass Stress-Optical Coefficient," the contents of which are incorporated herein by reference in their entirety. The modification of Procedure C includes using a glass disc as the specimen having a thickness of 5 to 10 mm and a diameter of 12.7 mm. The disc is isotropic and homogeneous, and is core-drilled with both faces polished and parallel. The modification also includes calculating the maximum force, Fmax to be applied to the disc. The force should be sufficient to produce at least 20 MPa compression stress. Fmax is calculated using the equation:

$$F\text{max}=7.854 \cdot D \cdot h$$

where: Fmax is maximum force, expressed in Newtons; D is the diameter of the disc, expressed in millimeters (mm); and h is the thickness of the light path, also expressed in mm. For each force applied, the stress is computed using the equation:

$$\sigma(MPa)=8F/(\pi \cdot D \cdot h)$$

where: F is the force, expressed in Newtons; D is the diameter of the disc, expressed in millimeters (mm); and h is the thickness of the light path, also expressed in millimeters.

Unless otherwise specified, the terms "depth of layer," "DOL," and "FSM_DOL" refer to the depth of the compressive layer as determined by surface stress measurements (FSM) measurements using commercially available instruments such as, but not limited to, the FSM-6000 stress meter. The depth of compression DOC refers to the depth at which the stress is effectively zero inside the glass and can be determined from the stress profile obtained using the refractive near field (RNF) and polarimetric methods that are known in the art. This DOC is typically less than the FSM_DOL measured by the FSM instrument for a single ion exchange process.

For strengthened glass articles in which the compressive stress layers extend to deeper depths within the glass, the FSM technique may suffer from contrast issues that affect the observed DOL value. At deeper depths of compressive layer, there may be inadequate contrast between the TE and TM spectra, thus making the calculation of the difference between the spectra of bound optical modes for TM and TE polarization—and accurate determination the DOL—more difficult. Moreover, the FSM software analysis is incapable of determining the compressive stress profile (i.e., the variation of compressive stress as a function of depth within the glass). In addition, the FSM technique is incapable of determining the depth of layer resulting from the ion exchange of certain elements in the glass such as, for example, the ion exchange of sodium for lithium.

The DOL as determined by the FSM is a relatively good approximation for the depth of the compressive layer of depth compression (DOC) when the DOL is a small fraction r of the thickness t and the index profile has a depth distribution that is reasonably well approximated with a simple linear truncated profile. When the DOL is a substantial fraction of the thickness, such as when DOL≥0.1·t, then the DOC is most often noticeably lower than the DOL. For example, in the idealized case of a linear truncated profile, the relationship DOC=DOL·(1−r) holds, where r=DOL/t.

Alternatively, the compressive stress, stress profile, and depth of layer may be determined using scattered linear polariscope (SCALP) techniques that are known in the art. The SCALP technique enables non-destructive measurement of surface stress and depth of layer.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are optically transparent glass ceramic materials which, in some embodiments, comprise a glass phase containing at least about 90% silica by weight and a crystalline tungsten bronze phase. These glass ceramics comprise a silicate glass phase and from about 0.1 mol % to about 10 mol %, or from about 1 mol % to about 4 mol %, or from about 0.5 mol % to about 5 mol % of a crystalline tungsten bronze phase comprising crystalline $M_xWO_3$ nanoparticles. In one embodiment, the crystalline $M_xWO_3$ nanoparticles are encapsulated within and dispersed within and, in some embodiments, throughout the residual glass phase. In another embodiment, the $M_xWO_3$ crystalline nanoparticles are disposed at or near the surface of the glass ceramic. In some embodiments, the $M_xWO_3$ crystalline nanoparticles are platelet-shaped and have an average diameter, determined by those means known in the art (e.g., SEM and/or TEM microscopy, x-ray diffraction, light scattering, centrifugal methods, etc.) ranging from about 10 nm to 1000 nm, or from about 10 nm to about 5 μm, and/or $M_xWO_3$ nanorods having a high aspect ratio and an average length, determined by those means known in the art, ranging from 10 nm to 1000 nm, and an average width, determined by those means known in the art, ranging from about 2 to about 75 nm. In some embodiments, tungsten bronze glass ceramics that exhibit high visible transparency and strong UV and NIR absorption contain high aspect ratio (length/width) $M_xWO_3$ rods having an average length ranging from about 10 nm to about 200 nm and an average width ranging from about 2 nm to 30 nm. The crystalline tungsten bronze phase has the formula $M_xWO_3$, where M is at least one of H, Li, Na, K, Rb, Cs, Ca, Sr, Ba, Zn, Cu, Ag, Sn, Cd, In, Tl, Pb, Bi, Th, La, Pr, Nd, Sm, Eu, Gd, Dy, Ho, Er, Tm, Yb, Lu, and U, and where $0<x<1$. These glass ceramics have a low coefficient of thermal expansion (CTE), strong attenuation or blocking of ultraviolet (UV) radiation at wavelengths of less than about 250 nm and near infrared (NIR) radiation at wavelengths ranging from about 700 nm to about 2500 nm.

In some embodiments, the glass ceramics described herein are optically transparent in the visible (i.e., wavelengths from about 400 nm to about 700 nm) region of the spectrum. That is, the glass ceramic has a transmittance of greater than about 1% over a 1 mm path (expressed herein as "%/mm") over at least one 50 nm-wide wavelength band of light in a range from about 400 nm to about 700 nm. In some embodiments, the glass ceramic has a transmittance of at least greater than about 10%/mm, in other embodiments, greater than about 50%/mm, in other embodiments, greater than about 75%/mm, in other embodiments, greater than about 80%/mm, and in still other embodiments, greater than about 90%/mm over at least one 50 nm-wide wavelength band of light in the visible region of the spectrum. In addition, these glass ceramics absorb light in the ultraviolet (UV) region (wavelengths of less than about 370 nm) and near infrared (NIR) region (from greater than about 700 nm to about 1700 nm) of the spectrum without use of coatings or films, which are mechanically fragile and sensitive to UV light and moisture. In some embodiments, the glass ceramic has a transmittance of less than 5%/mm and, in other embodiments, less than 1%/mm for light having a wavelength of about 370 nm or less. In some embodiments, the glass ceramic has an absorption of at least 90%/mm, in other embodiments, at least than 95%/mm, and in other embodiments, at least than 99%/mm for light having a wavelength of about 370 nm or less. In some embodiments, the glass ceramic has a transmittance of less than 10%/mm and, in other embodiments, less than 5%/mm over at least one 50 nm-wide wavelength band of light for light in the NIR region (i.e., from about 700 nm to about 2500 nm) of the spectrum. In some embodiments, the glass ceramic has an absorption of at least 90%/mm and, in other embodiments, at least 95%/mm over at least one 50 nm-wide wavelength band of light for light in the NIR region (i.e., from about 700 nm to about 2500 nm) of the spectrum.

In some embodiments, the glass ceramics described herein are capable of withstanding temperatures of at least about 300° C., or, in some embodiments, at least about 200° C., without impairing their optical or mechanical properties. In some embodiments, the transmittance of the glass ceramic between about 500 nm and about 2500 nm changes by less than 10%/mm when the glass ceramic is heated at temperatures in a range from about 200° C. to about 300° C. for periods of at least one hour. These glass ceramics are, in some embodiments, unreactive and otherwise impervious to oxygen, hydrogen, and moisture. The impervious nature of the glass ceramic has been demonstrated by exposing selected samples (e.g., samples 13, 14, 15, and 16 in Table 1) to 312 nm and 365 nm light for periods of up to 7 days. No change in the optical absorbance of these samples was observed following such exposure, indicating that oxygen, moisture, and/or hydrogen did not react with and alter the $M_xWO_3$ crystalline phase.

In some embodiments, the glass ceramics described herein have a coefficient of thermal expansion (CTE) at temperatures ranging from about 0° C. to about 300° C. of about $75\times10^{-7}$ $C.^{-1}$. In some embodiments, the glass ceramics have a coefficient of thermal expansion (CTE) at temperatures ranging from about 0° C. to about 300° C. from about $33.5\times10^{-7}$ $C.^{-1}$ to about $66.3\times10^{-7}$ $C.^{-1}$ (e.g., samples 2, 11, 12, 13, and 54 in Table 1).

In some embodiments, the glass ceramics described herein are bleachable—i.e., the crystalline $M_xWO_3$ may be "erased" by thermally treating the glasses/glass ceramics for a short period above their respective softening points. Such thermal treatment may be performed using those energy sources known in the art, such as, but not limited to, resistance furnaces, lasers, microwaves, or the like. Composition 37 (Table 1), for example, may be bleached by holding the material at a temperature between about 685° C. and about 740° C. for approximately 5 minutes. The $M_xWO_3$ bronze phase may then be re-formed or re-crystallized on the surface of the material by exposure to a UV-pulsed laser; i.e., the tungsten bronze phase will be re-formed in those areas exposed to the laser.

The glass ceramics described herein may be used for low-emittance glazing in architectural, automotive, medical, aerospace, or other applications, including thermal face shields, medical eyewear, optical filters, and the like. In some embodiments, the glass ceramic forms a portion of a consumer electronic product, such as a cellular phone or smart phone, laptop computer, tablet, or the like. Such consumer electronic products typically comprise a housing having front, back, and side surfaces, and includes electrical components, which are at least partially internal to the housing. The electrical components include at least a power source, a controller, a memory, and a display. In some embodiments, the glass ceramic described herein comprises at least a portion of a protective element, such as, but not limited to, the housing and/or display.

In some embodiments, the glass phase is a borosilicate glass and the glass ceramic comprises $SiO_2$, $Al_2O_3$, $B_2O_3$, $WO_3$, and at least one alkali metal oxide $R_2O$, where $R_2O$ is at least one of $Na_2O$, $K_2O$, $Cs_2O$, and/or $Rb_2O$, and the crystalline tungsten bronze phase is an tungsten bronze solid solution containing, comprising, or consisting essentially of $MWO_3$, where M is at least one of $Na_2O$, $K_2O$, $Cs_2O$, and $Rb_2O$. In some embodiments, the crystalline alkali tungsten bronze phase is a crystalline alkali tungsten bronze phase which is a mixture of alkali tungsten bronze solid solutions $M1_xM2_yWO_3$, where M1=Li, Na, K, Cs, Rb and M2=Li, Na, K, Cs, Rb, where M1≠M2 and 0<(x+y)<1.

In some embodiments, the glass ceramic comprises: from about 56 mol % to about 78 mol % $SiO_2$ (56 mol %≤$SiO_2$≤78 mol %) or from about 60 mol % to about 78 mol % $SiO_2$ (60 mol %≤$SiO_2$≤78 mol %); from about 8 mol % to about 27 mol % $B_2O_3$ (8 mol %≤$B_2O_3$≤27 mol %); from about 0.5 mol % to about 14 mol % $Al_2O_3$ (0.5 mol %≤$Al_2O_3$≤14 mol %); from greater than 0 mol % to about 10 mol % of at least one of $Na_2O$, $K_2O$, $Cs_2O$, and $Rb_2O$ (0 mol %<$Na_2O+K_2O+Cs_2O+Rb_2O$≤9 mol %); from about 1 mol % to about 10 mol % $WO_3$ (1 mol %≤$WO_3$≤10 mol %) or, in some embodiments, from about 1 mol % to about 5 mol % $WO_3$ (1 mol %≤$WO_3$≤5 mol %); and from 0 mol % to about 0.5 mol % $SnO_2$ (0 mol %≤$SnO_2$≤0.5). In some embodiments, the glass ceramic may comprise from 0 mol % to about 9 mol % $Li_2O$; in some embodiments, from 0 mol % to about 9 mol % $Na_2O$ (0 mol %<$Na_2O$≤9 mol %); in some embodiments, from 0 mol % to about 9 mol % $K_2O$ (0 mol %<$K_2O$≤9 mol %) or from 0 mol % to about 3 mol % $K_2O$ (0 mol %<$K_2O$≤3 mol %); in some embodiments, from 0 mol % to about 10 mol % $Cs_2O$ (0 mol %<$Cs_2O$≤10 mol %) or from greater than 0 mol % to about 7 mol % $Cs_2O$ (0 mol %<$Cs_2O$≤7 mol %); and/or, in some embodiments, from 0 mol % to about 9 mol % $Rb_2O$ (0 mol %<$Rb_2O$≤9 mol %). In some embodiments, the glass ceramic comprises from about 9.8 mol % to about 11.4 mol % $B_2O_3$ (9.8 mol %≤$B_2O_3$≤11.4 mol %).

In certain embodiments, the glass ceramics described herein comprise: from about 80 mol % to about 97 mol % $SiO_2$ (80 mol %≤$SiO_2$≤97 mol %); from 0 mol % to about 5 mol % $Al_2O_3$ (0 mol %≤$Al_2O_3$≤5 mol %); from 0 mol % to about 2 mol % $R_2O$ (0 mol %≤$R_2O$≤2 mol %), where $R_2O$=$Li_2O$, $Na_2O$, $K_2O$, and/or $Cs_2O$, or from greater than 0 mol % to about 2 mol % $Cs_2O$ (0 mol %<$Cs_2O$≤2 mol %), or from greater than 0 mol % to about 0.5 mol % $Cs_2O$ (0 mol %<$Cs_2O$≤0.5 mol %); and from about 0.2 mol % to about 2 mol % $WO_3$ (0.2 mol %≤$WO_3$≤2 mol %). In particular embodiments, the glass ceramics comprise: from about 87 mol % to about 93 mol % $SiO_2$ (87 mol %≤$SiO_2$≤93 mol %); from 0 mol % to about 0.5 mol % $Al_2O_3$ (0 mol %≤$Al_2O_3$≤0.5 mol %); from 3 mol % to about 6 mol % $B_2O_3$ (3 mol %≤$B_2O_3$≤6 mol %); from 0.75 mol % $WO_3$ to about 1.25 mol % $WO_3$ (0.75 mol %≤$WO_3$≤1.25 mol %); and from 0.2 mol % to about 2 mol % $R_2O$, where R=Li, Na, K, and/or Cs (0.2 mol %≤$R_2O$≤2 mol %).

In some embodiments, the glass ceramic may further comprise at least one of: up to about 0.5 mol % MgO (0 mol %≤MgO≤0.5 mol %); up to about 2 mol % $P_2O_5$ (0 mol %≤$P_2O_5$≤2 mol %); and up to about 1 mol % (0 mol %≤ZnO≤1 mol %). The rate of formation of $M_xWO_3$ upon cooling or heat treatment may be increased by the addition of at least one of MgO (e.g., samples 55, 56, and 57 in Table 1), $P_2O_5$. (e.g., sample 58 in Table 1), and ZnO up (e.g., sample 59 in Table 1).

Non-limiting compositions of glass ceramics that are transparent in the visible light range and UV and NIR-absorbing are listed in Table 1. Compositions that do not absorb either UV or NIR radiation are listed in Table 2.

TABLE 1

Compositions of glass ceramics that are optically transparent in the visible light range and absorbing in the UV and NIR light ranges.

| Mol % | 1 | 2 | 3 | 4 | 5 | 6 | 7 | 8 | 9 | 10 |
|---|---|---|---|---|---|---|---|---|---|---|
| $SiO_2$ | 76.9 | 75.9 | 72.9 | 69.9 | 65.9 | 77.6 | 76.9 | 61.7 | 61.7 | 65.9 |
| $B_2O_3$ | 17 | 17 | 20 | 23 | 27 | 20 | 17 | 20 | 20 | 20 |
| $Al_2O_3$ | 2 | 2 | 2 | 2 | 2 | 0.66 | 1.32 | 6.6 | 6.6 | 5 |
| $Li_2O$ | 0 | 0 | 0 | 0 | 0 | 0 | 0 | 0 | 0 | 0 |
| $Na_2O$ | 0 | 0 | 0 | 0 | 0 | 0 | 0 | 0 | 0 | 0 |
| $K_2O$ | 0 | 0 | 0 | 0 | 0 | 0 | 0 | 0 | 0 | 0 |
| $Cs_2O$ | 1 | 2 | 2 | 2 | 2 | 0.66 | 0.66 | 1.32 | 6.6 | 5 |
| $WO_3$ | 3 | 3 | 3 | 3 | 3 | 1 | 1 | 1 | 5 | 4 |
| $SnO_2$ | 0.1 | 0.1 | 0.1 | 0.1 | 0.1 | 0.1 | 0.1 | 0.1 | 0.1 | 0.1 |
| $La_2O_3$ | 0 | 0 | 0 | 0 | 0 | 0 | 0 | 0 | 0 | 0 |
| $Eu_2O_3$ | 0 | 0 | 0 | 0 | 0 | 0 | 0 | 0 | 0 | 0 |
| $MnO_2$ | 0 | 0 | 0 | 0 | 0 | 0 | 0 | 0 | 0 | 0 |
| $Fe_2O_3$ | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 |
| MgO | 0 | 0 | 0 | 0 | 0 | 0 | 0 | 0 | 0 | 0 |

| Mol % | 11 | 12 | 13 | 14 | 15 | 16 | 17 | 18 | 19 | 20 |
|---|---|---|---|---|---|---|---|---|---|---|
| $SiO_2$ | 64.9 | 63.9 | 63.9 | 63.9 | 63.9 | 63.9 | 62.9 | 61.9 | 64.9 | 62.9 |
| $B_2O_3$ | 20 | 20 | 20 | 20 | 20 | 20 | 20 | 20 | 20 | 20 |
| $Al_2O_3$ | 5 | 7 | 9 | 9 | 9 | 9 | 10 | 11 | 9 | 9 |
| $Li_2O$ | 0 | 0 | 0 | 3 | 0 | 0 | 0 | 0 | 0 | 0 |
| $Na_2O$ | 0 | 0 | 0 | 0 | 3 | 0 | 0 | 0 | 0 | 0 |
| $K_2O$ | 0 | 0 | 0 | 0 | 0 | 3 | 0 | 0 | 0 | 0 |
| $Cs_2O$ | 5 | 5 | 3 | 0 | 0 | 0 | 3 | 3 | 2 | 4 |
| $WO_3$ | 5 | 4 | 4 | 4 | 4 | 4 | 4 | 4 | 4 | 4 |
| $SnO_2$ | 0.1 | 0.1 | 0.1 | 0.1 | 0.1 | 0.1 | 0.1 | 0.1 | 0.1 | 0.1 |
| $La_2O_3$ | 0 | 0 | 0 | 0 | 0 | 0 | 0 | 0 | 0 | 0 |
| $Eu_2O_3$ | 0 | 0 | 0 | 0 | 0 | 0 | 0 | 0 | 0 | 0 |
| $MnO_2$ | 0 | 0 | 0 | 0 | 0 | 0 | 0 | 0 | 0 | 0 |
| $Fe_2O_3$ | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 |

TABLE 1-continued

Compositions of glass ceramics that are optically transparent in the visible light range and absorbing in the UV and NIR light ranges.

| | | | | | | | | | | |
|---|---|---|---|---|---|---|---|---|---|---|
| $Sb_2O_3$ | 0 | 0 | 0 | 0 | 0 | 0 | 0 | 0 | 0 | 0 |
| MgO | 0 | 0 | 0 | 0 | 0 | 0 | 0 | 0 | 0 | 0 |

| Mol % | 21 | 22 | 23 | 24 | 25 | 26 | 27 | 28 | 29 | 30 |
|---|---|---|---|---|---|---|---|---|---|---|
| $SiO_2$ | 63.9 | 61.9 | 63.9 | 63.9 | 63.9 | 64 | 64.4 | 64.9 | 65.4 | 64.9 |
| $B_2O_3$ | 20 | 20 | 20 | 20 | 20 | 20 | 20 | 20 | 20 | 20 |
| $Al_2O_3$ | 10 | 12 | 9 | 9 | 9 | 9 | 9 | 9 | 9 | 9 |
| $Li_2O$ | 0 | 0 | 0 | 1.5 | 1.5 | 3 | 3 | 3 | 3 | 2 |
| $Na_2O$ | 0 | 0 | 0 | 0 | 0 | 0 | 0 | 0 | 0 | 0 |
| $K_2O$ | 0 | 0 | 0 | 1.5 | 0 | 0 | 0 | 0 | 0 | 0 |
| $Cs_2O$ | 2 | 2 | 2.9 | 0 | 1.5 | 0 | 0 | 0 | 0 | 0 |
| $WO_3$ | 4 | 4 | 4 | 4 | 4 | 4 | 3.5 | 3 | 2.5 | 4 |
| $SnO_2$ | 0.1 | 0.1 | 0.1 | 0.1 | 0.1 | 0 | 0.1 | 0.1 | 0.1 | 0.1 |
| $La_2O_3$ | 0 | 0 | 0 | 0 | 0 | 0 | 0 | 0 | 0 | 0 |
| $Eu_2O_3$ | 0 | 0 | 0.1 | 0 | 0 | 0 | 0 | 0 | 0 | 0 |
| $MnO_2$ | 0 | 0 | 0 | 0 | 0 | 0 | 0 | 0 | 0 | 0 |
| $Fe_2O_3$ | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 |
| MgO | 0 | 0 | 0 | 0 | 0 | 0 | 0 | 0 | 0 | 0 |

| Mol % | 31 | 32 | 33 | 34 | 35 | 36 | 37 | 38 | 39 | 40 |
|---|---|---|---|---|---|---|---|---|---|---|
| $SiO_2$ | 65.9 | 66.9 | 65.9 | 66.4 | 60.9 | 65.9 | 69.9 | 66 | 65.9 | 65.8 |
| $B_2O_3$ | 20 | 20 | 20 | 20 | 20 | 15 | 10 | 20 | 20 | 20 |
| $Al_2O_3$ | 9 | 9 | 9 | 9 | 9 | 9 | 10 | 9 | 9 | 9 |
| $Li_2O$ | 1 | 0 | 3 | 3 | 6 | 6 | 6 | 3 | 3 | 3 |
| $Na_2O$ | 0 | 0 | 0 | 0 | 0 | 0 | 0 | 0 | 0 | 0 |
| $K_2O$ | 0 | 0 | 0 | 0 | 0 | 0 | 0 | 0 | 0 | 0 |
| $Cs_2O$ | 0 | 0 | 0 | 0 | 0 | 0 | 0 | 0 | 0 | 0 |
| $WO_3$ | 4 | 4 | 2 | 1.5 | 4 | 4 | 4 | 2 | 2 | 2 |
| $SnO_2$ | 0.1 | 0.1 | 0.1 | 0.1 | 0.1 | 0.1 | 0.1 | 0 | 0.1 | 0.2 |
| $La_2O_3$ | 0 | 0 | 0 | 0 | 0 | 0 | 0 | 0 | 0 | 0 |
| $Eu_2O_3$ | 0 | 0 | 0 | 0 | 0 | 0 | 0 | 0 | 0 | 0 |
| $MnO_2$ | 0 | 0 | 0 | 0 | 0 | 0 | 0 | 0 | 0 | 0 |
| $Fe_2O_3$ | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 |
| MgO | 0 | 0 | 0 | 0 | 0 | 0 | 0 | 0 | 0 | 0 |

| Mol % | 41 | 42 | 43 | 44 | 45 | 46 | 47 | 48 | 49 | 50 |
|---|---|---|---|---|---|---|---|---|---|---|
| $SiO_2$ | 65.6 | 65.8 | 65.9 | 70.1 | 70.1 | 69.85 | 70.35 | 70.1 | 69.9 | 68.1 |
| $B_2O_3$ | 20 | 20 | 20 | 10.35 | 9.8 | 9.8 | 9.8 | 12.35 | 10.35 | 11.35 |
| $Al_2O_3$ | 9 | 9 | 9 | 10 | 10 | 10 | 10 | 9 | 10 | 10 |
| $Li_2O$ | 3 | 3 | 3 | 0 | 8.475 | 8.6 | 8.35 | 7.7 | 8.2 | 8.7 |
| $Na_2O$ | 0 | 0 | 0 | 8.2 | 1.525 | 1.65 | 1.4 | 0.75 | 1.25 | 1.75 |
| $K_2O$ | 0 | 0 | 0 | 1.25 | 0 | 0 | 0 | 0 | 0 | 0 |
| $Cs_2O$ | 0 | 0 | 0 | 0 | 0 | 0 | 0 | 0 | 0 | 0 |
| $WO_3$ | 2 | 2 | 2 | 4 | 4 | 4 | 4 | 4 | 4 | 4 |
| $SnO_2$ | 0.4 | 0 | 0 | 0.1 | 0.1 | 0.1 | 0.1 | 0.1 | 0.3 | 0.1 |
| $La_2O_3$ | 0 | 0 | 0 | 0 | 0 | 0 | 0 | 0 | 0 | 0 |
| $Eu_2O_3$ | 0 | 0 | 0 | 0 | 0 | 0 | 0 | 0 | 0 | 0 |
| $MnO_2$ | 0 | 0.2 | 0 | 0 | 0 | 0 | 0 | 0 | 0 | 0 |
| $Fe_2O_3$ | 0 | 0 | 0.1 | 0 | 0 | 0 | 0 | 0 | 0 | 0 |
| $CeO_2$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 |
| MgO | 0 | 0 | 0 | 0 | 0 | 0 | 0 | 0 | 0 | 0 |

| Mol % | 51 | 52 | 53 | 54 | 55 | 56 | 57 | 58 | 59 | 60 | 61 |
|---|---|---|---|---|---|---|---|---|---|---|---|
| $SiO_2$ | 69.85 | 69.85 | 69.85 | 69.85 | 70.25 | 69.85 | 69.35 | 68.85 | 69.1 | 69.75 | 68.75 |
| $B_2O_3$ | 9.8 | 9.8 | 9.8 | 9.8 | 9.8 | 9.8 | 9.8 | 9.8 | 9.8 | 9.8 | 10.8 |
| $Al_2O_3$ | 10 | 10 | 10 | 9.75 | 10 | 10 | 9.375 | 10 | 10 | 10 | 10 |
| $Li_2O$ | 0 | 4 | 8 | 0 | 0 | 0 | 0 | 0 | 0 | 0 | 3 |
| $Na_2O$ | 8.6 | 4.6 | 0.6 | 8.725 | 8.35 | 8.35 | 8.975 | 8.6 | 8.6 | 8.6 | 7.25 |
| $K_2O$ | 1.65 | 1.65 | 1.65 | 1.775 | 1.4 | 1.4 | 1.4 | 1.65 | 1.65 | 1.65 | 0 |
| $Cs_2O$ | 0 | 0 | 0 | 0 | 0 | 0 | 0 | 0 | 0 | 0 | 0 |
| $WO_3$ | 4 | 4 | 4 | 3.5 | 4 | 4 | 4 | 4 | 4 | 4 | 4 |
| $SnO_2$ | 0.1 | 0.1 | 0.1 | 0.1 | 0.1 | 0.1 | 0.1 | 0.1 | 0.1 | 0.1 | 0.1 |
| $La_2O_3$ | 0 | 0 | 0 | 0 | 0 | 0 | 0 | 0 | 0 | 0 | 0 |
| $Eu_2O_3$ | 0 | 0 | 0 | 0 | 0 | 0 | 0 | 0 | 0 | 0 | 0 |
| $MnO_2$ | 0 | 0 | 0 | 0 | 0 | 0 | 0 | 0 | 0 | 0 | 0 |
| $Fe_2O_3$ | 0 | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 | 0 |

TABLE 1-continued

Compositions of glass ceramics that are optically transparent in the visible light range and absorbing in the UV and NIR light ranges.

| | | | | | | | | | | | |
|---|---|---|---|---|---|---|---|---|---|---|---|
| MgO | 0 | 0 | 0 | 0 | 0.1 | 0.5 | 1 | 0 | 0 | 0 | 0.1 |
| $P_2O_5$ | 0 | 0 | 0 | 0 | 0 | 0 | 0 | 0 | 0 | 0 | 0 |
| ZnO | 0 | 0 | 0 | 0 | 0 | 0 | 0 | 1 | 0 | 0 | 0 |
| $As_2O_5$ | 0 | 0 | 0 | 0 | 0 | 0 | 0 | 0 | 0.75 | 0 | 0 |

TABLE 2

Compositions of glass ceramics that do not absorb radiation in the UV and NIR light ranges.

| Mol % | 62 | 63 | 64 | 65 | 66 | 67 | 68 | 69 | 70 | 71 |
|---|---|---|---|---|---|---|---|---|---|---|
| $SiO_2$ | 77.9 | 77.94 | 72.3 | 65.7 | 64.7 | 63.7 | 65.7 | 65.7 | 64.2 | 62.7 |
| $B_2O_3$ | 20.7 | 20 | 20 | 20 | 20 | 20 | 20 | 20 | 20 | 20 |
| $Al_2O_3$ | 0 | 0.3 | 3.3 | 6.6 | 6.6 | 0.66 | 5.6 | 4.6 | 8.1 | 9.6 |
| $Li_2O$ | 0 | 0 | 0 | 0 | 0 | 0 | 0 | 0 | 0 | 0 |
| $Na_2O$ | 0 | 0 | 0 | 0 | 0 | 0 | 0 | 0 | 0 | 0 |
| $K_2O$ | 0 | 0 | 0 | 0 | 0 | 0 | 0 | 0 | 0 | 0 |
| $Cs_2O$ | 0.3 | 0.66 | 3.3 | 6.6 | 6.6 | 6.6 | 7.6 | 8.6 | 6.6 | 6.6 |
| $WO_3$ | 1 | 1 | 1 | 1 | 2 | 3 | 1 | 1 | 1 | 1 |
| $SnO_2$ | 0.1 | 0.1 | 0.1 | 0.1 | 0.1 | 0.1 | 0.1 | 0.1 | 0.1 | 0.1 |
| $La_2O_3$ | 0 | 0 | 0 | 0 | 0 | 0 | 0 | 0 | 0 | 0 |
| $Eu_2O_3$ | 0 | 0 | 0 | 0 | 0 | 0 | 0 | 0 | 0 | 0 |
| $MnO_2$ | 0 | 0 | 0 | 0 | 0 | 0 | 0 | 0 | 0 | 0 |
| $Fe_2O_3$ | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 |
| MgO | 0 | 0 | 0 | 0 | 0 | 0 | 0 | 0 | 0 | 0 |

| Mol % | 72 | 73 | 74 | 75 | 76 | 77 | 78 | 79 | 80 | 81 |
|---|---|---|---|---|---|---|---|---|---|---|
| $SiO_2$ | 62.2 | 60.7 | 62.7 | 60.1 | 63.9 | 63.9 | 63.9 | 66.9 | 67.9 | 65.9 |
| $B_2O_3$ | 20 | 20 | 20 | 20 | 20 | 20 | 20 | 20 | 10 | 10 |
| $Al_2O_3$ | 8.1 | 9.6 | 6.6 | 6.6 | 5 | 9 | 9 | 9 | 10 | 10 |
| $Li_2O$ | 0 | 0 | 0 | 0 | 0 | 0 | 0 | 3 | 8 | 10 |
| $Na_2O$ | 0 | 0 | 0 | 0 | 0 | 0 | 0 | 0 | 0 | 0 |
| $K_2O$ | 0 | 0 | 0 | 0 | 0 | 0 | 0 | 0 | 0 | 0 |
| $Cs_2O$ | 6.6 | 6.6 | 6.6 | 6.6 | 7 | 0 | 0 | 0 | 0 | 0 |
| $WO_3$ | 3 | 3 | 4 | 6.6 | 4 | 4 | 4 | 1 | 4 | 4 |
| $SnO_2$ | 0.1 | 0.1 | 0.1 | 0.1 | 0.1 | 0.1 | 0.1 | 0.1 | 0.1 | 0.1 |
| $La_2O_3$ | 0 | 0 | 0 | 0 | 0 | 3 | 0 | 0 | 0 | 0 |
| $Eu_2O_3$ | 0 | 0 | 0 | 0 | 0 | 0 | 3 | 0 | 0 | 0 |
| $MnO_2$ | 0 | 0 | 0 | 0 | 0 | 0 | 0 | 0 | 0 | 0 |
| $Fe_2O_3$ | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 |
| MgO | 0 | 0 | 0 | 0 | 0 | 0 | 0 | 0 | 0 | 0 |

| Mol % | 82 | 83 | 84 | 85 | 86 | 87 | 88 | 89 | 90 | 79 |
|---|---|---|---|---|---|---|---|---|---|---|
| $SiO_2$ | 63.9 | 65.8 | 65.9 | 65.75 | 67 | 67 | 70.1 | 69.35 | 70.1 | 70.1 |
| $B_2O_3$ | 10 | 20 | 20 | 20 | 8.1 | 9.1 | 9.35 | 9.8 | 9.35 | 9.35 |
| $Al_2O_3$ | 10 | 9 | 9 | 9 | 12.6 | 12.6 | 10 | 10 | 10 | 10 |
| $Li_2O$ | 12 | 3 | 3 | 3 | 5.1 | 5.1 | 8.242 | 8.35 | 8.7 | 8.7 |
| $Na_2O$ | 0 | 0 | 0 | 0 | 6.2 | 5.7 | 2.208 | 1.4 | 1.75 | 1.75 |
| $K_2O$ | 0 | 0 | 0 | 0 | 0.8 | 0.3 | 0 | 0 | 0 | 0 |
| $Cs_2O$ | 0 | 0 | 0 | 0 | 0 | 0 | 0 | 0 | 0 | 0 |
| $WO_3$ | 4 | 2 | 2 | 2 | 4 | 4 | 4 | 4 | 2.5 | 2.5 |
| $SnO_2$ | 0.1 | 0 | 0 | 0 | 0.1 | 0.1 | 0.1 | 0.1 | 0.1 | 0.1 |
| $La_2O_3$ | 0 | 0 | 0 | 0 | 0 | 0 | 0 | 0 | 0 | 0 |
| $Eu_2O_3$ | 0 | 0 | 0 | 0 | 0 | 0 | 0 | 0 | 0 | 0 |
| $MnO_2$ | 0 | 0 | 0 | 0 | 0 | 0 | 0 | 0 | 0 | 0 |
| $Fe_2O_3$ | 0 | 0 | 0 | 0 | 0 | 0 | 0 | 0 | 0 | 0 |
| $CeO_2$ | 0 | 0.2 | 0 | 0.2 | 0 | 0 | 0 | 0 | 0 | 0 |
| $Sb_2O_3$ | 0 | 0 | 0.1 | 0.05 | 0 | 0 | 0 | 0 | 0 | 0 |
| MgO | 0 | 0 | 0 | 0 | 0 | 0 | 0 | 1 | 0 | 0 |

In some embodiments, −10 mol %≤$R_2O$ (mol %)—$Al_2O_3$ (mol %)≤0.1 mol %. With respect to how composition and heat treatment affect the optical properties of the glass ceramic, peraluminous melts may be divided into three sub-categories. As used herein, the term "peraluminous melts" refer to melts in which the molar proportion or content of alumina that is greater than that of $R_2O$, where $R_2O$ is at least one of $Li_2O$, $Na_2O$, $K_2O$, and $Cs_2O$; i.e. $Al_2O_3$ (mol %)>$R_2O$ (mol %). The first sub-category is one in which peraluminous melts, when quenched rapidly from the molten state and after annealing, are transparent in the visible wavelength range and NIR regime (e.g., samples 12, 15-17, 20, 23, 25, 33, 35-42, 44, 46, 47, and 48 in Table 1). These materials require a subsequent heat treatment at or slightly above the anneal temperature but below the softening point in order to develop the NIR-absorbing nanocrystalline $M_xWO_3$ phase. The change in optical properties as a function of heat treatment is illustrated in FIG. 1, which is a plot of absorbance vs. wavelength for splat-quenched, annealed, and heat-treated samples of composition 13. As used herein, the term "splat-quenching" refers to the process of pouring a small amount or "glob" of molten glass onto an iron plate that is at room temperature and immediately pressing the glob with an iron plunger (also at room temperature) so as to rapidly cool the glass and press the glob into a thin (3-6 mm) disc of glass. While the splat-quenched (A in FIG. 1) and annealed samples (B) of composition/sample 13 show no absorption in the visible or NIR regimes, those samples that have been heat treated (C, D, E) exhibit absorbance in the NIR regime that increases with increasing heat treatment time, as well as some visible light attenuation at wavelengths in the 600-700 nm range, resulting in a material having a blue hue.

Figure 2:
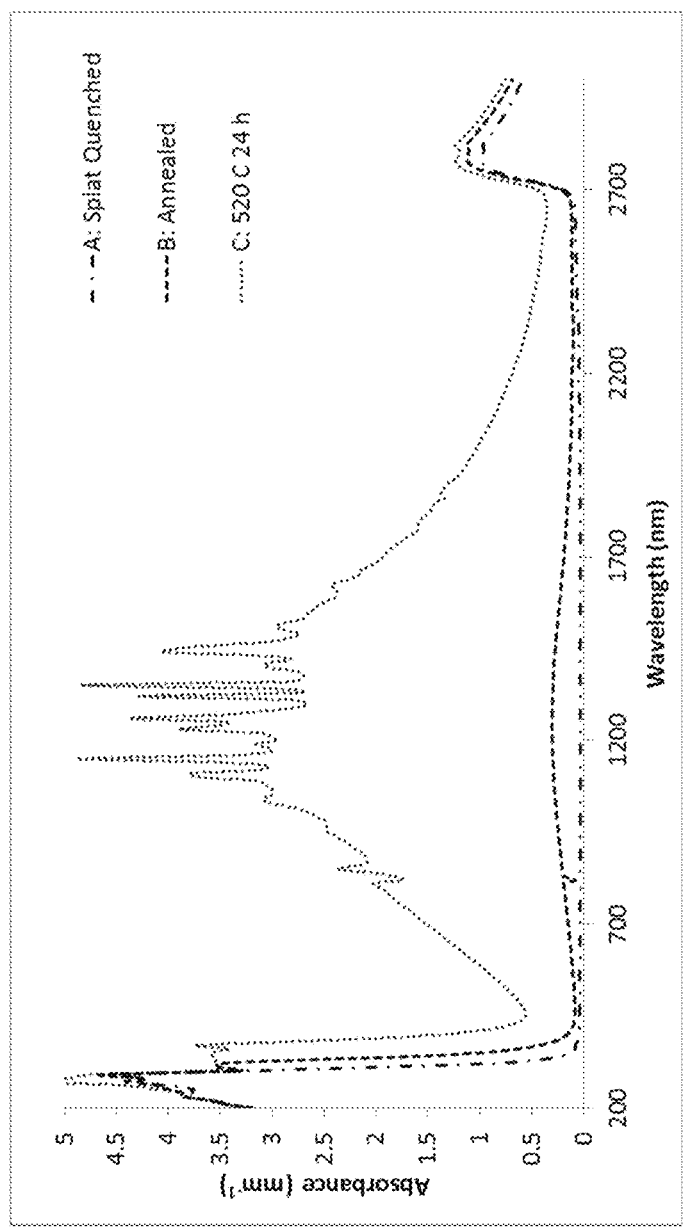
FIG. 2 is a plot of spectra of splat-quenched (A), annealed (B), and heat-treated (C) glass ceramic compositions.

The second category of peraluminous melts remains transparent in the visible and NIR regimes if rapidly quenched, but exhibits NIR absorption post annealing (see samples 12, 14, 19, 21, 22, 24, and 26-32 in Table 1). As with the previously described group of peraluminous melts and shown in FIG. 2, which shows spectra of splat-quenched (A), annealed (B), and heat-treated (C) samples of glass ceramic composition 11, the NIR absorbance of the splat-quenched or annealed glass ceramic may be enhanced by further heat treatment.

The third category of peraluminous melts exhibits NIR absorption even upon rapid quenching (see samples 1 and 7 in Table 1). The NIR absorption of these materials may be further enhanced by subsequent heat treatment at or above the annealing point, but below the softening point.

Near-charge balanced melts (i.e., $R_2O$ (mol %)—$Al_2O_3$ (mol %)=0±0.25 mol %) may, upon rapid quenching, be transparent in the visible and NIR absorbing post annealing (see samples 8-11 and 45 in Table 1), or NIR absorbing following either rapid quenching or annealing (see samples 2-7 in Table 1). As with the melts previously described hereinabove, NIR absorption may be further enhanced by subsequent heat treatment at or above the annealing point, but below the softening point.

Two peralkaline (i.e., $R_2O$ (mol %)>$Al_2O_3$ (mol %)) UV- and NIR-absorbing melts (samples 46 and 50 in Table 1) were transparent in the visible and NIR when rapidly quenched but were NIR-absorbing after annealing. As with the melts previously described hereinabove, NIR absorption may be further enhanced by subsequent heat treatment at or above the annealing point, but below the softening point.

The rate of formation of the crystalline $M_xWO_3$ phase, which determines optical absorbance, may also be tuned by adjusting at least one of heat treatment time and temperature; the ($R_2O$ (mol %)+$Al_2O_3$ (mol %))/$WO_3$ (mol %) ratio; the $R_2O$ (mol %)/$WO_3$ (mol %) ratio; the $Al_2O_3$ (mol %)/$WO_3$ (mol %) ratio; and selection of alkali (or alkalis) to be batched. In all instances, more of the crystalline $M_xWO_3$ phase precipitates with longer heat treatment times, resulting in a material having stronger NIR absorption. However, excessive heat treatment times may cause the crystalline $M_xWO_3$ phase to coarsen. In some cases, coarsening may be accompanied by formation of a secondary or tertiary crystalline phase such as borastalite or aluminum borate. The formation of these secondary phases may produce a material that scatters visible wavelengths of light and thus appears hazy or opalescent. In addition, the rate of $M_xWO_3$ formation in most instances increases as the heat treatment temperature increases and approaches the softening point of the glass.

In some embodiments, $1 \leq (R_2O$ (mol %)+$Al_2O_3$ (mol %))/$WO_3$ (mol %)$\leq 6$. As the ratio ($R_2O$ (mol %)+$Al_2O_3$ (mol %))/$WO_3$ (mol %) increases, the rate of $M_xWO_3$ formation decreases. When ($R_2O$ (mol %)+$Al_2O_3$ (mol %))/$WO_3$ (mol %)$\geq 6$, the NIR-absorbing crystalline $M_xWO_3$ phase ceases to precipitate from the melt.

In those glasses in which the crystalline $M_xWO_3$ NIR-absorbing phase precipitates, the ratio $R_2O$ (mol %)/$WO_3$ (mol %) is greater than or equal to 0 and less than or equal to about 4 ($0 \leq R_2O$ (mol %)/$WO_3$ (mol %)$\leq 4$), and the ratio $Al_2O_3$ (mol %)/$WO_3$ (mol %) is in a range from about 0.66 and about 6 ($0.66 \leq Al_2O_3$ (mol %)/$WO_3$ (mol %)$\leq 6$). When $R_2O$ (mol %)/$WO_3$ (mol %) is greater than 4 ($R_2O$ (mol %)/$WO_3$ (mol %)>4), the glasses may precipitate a dense immiscible second phase and separate, resulting in an inhomogeneous melt. When the $Al_2O_3$ (mol %)/$WO_3$ (mol %) ratio exceeds 6 ($Al_2O_3$ (mol %)/$WO_3$ (mol %)>6), the glasses cease to precipitate the crystalline $M_xWO_3$ NIR-absorbing phase. When the $Al_2O_3$ (mol %)/$WO_3$ (mol %) ratio equals 6 ($Al_2O_3$ (mol %)/$WO_3$ (mol %)=6), such as in sample 34 in Table 1, the NIR absorbing nanocrystalline $M_xWO_3$ bronze forms, but does so very slowly. It is preferable that the $R_2O$ (mol %)/$WO_3$ (mol %) ratio is in a range from about 0 to about 3.5 ($0 \leq R_2O/WO_3 \leq 3.5$) (e.g., sample 26 in Table 1). Most preferably, $R_2O/WO_3$ is in a range from about 1.25 and about 3.5 ($1.25 \leq R_2O$ (mol %)/$WO_3$ (mol %)$\leq 3.5$) (e.g., sample 53 in Table 1), as samples in this compositional range rapidly precipitate the UV and NIR absorbing $M_xWO_3$ crystalline phase, exhibit high visible transparency with strong NIR absorption, and are bleachable (i.e., the $M_xWO_3$ crystalline phase can be "erased"). The ratio $Al_2O_3$ (mol %)/$WO_3$ (mol %) is, in certain embodiments, is in a range from about 0.66 and about 4.5 ($0.66 \leq Al_2O_3$ (mol %)/$WO_3$ (mol %)$\leq 4.5$) (e.g., sample 40 in Table 1), and, most preferably, $Al_2O_3$ (mol %)/$WO_3$ (mol %) is is in a range from about 2 to about 3 ($1 \leq Al_2O_3$ (mol %)/$WO_3$ (mol %)$\leq 3$) (e.g., sample 61 in Table 1). Above this range, the NIR absorbing nanocrystalline $M_xWO_3$ bronze forms slowly.

Figure 3:
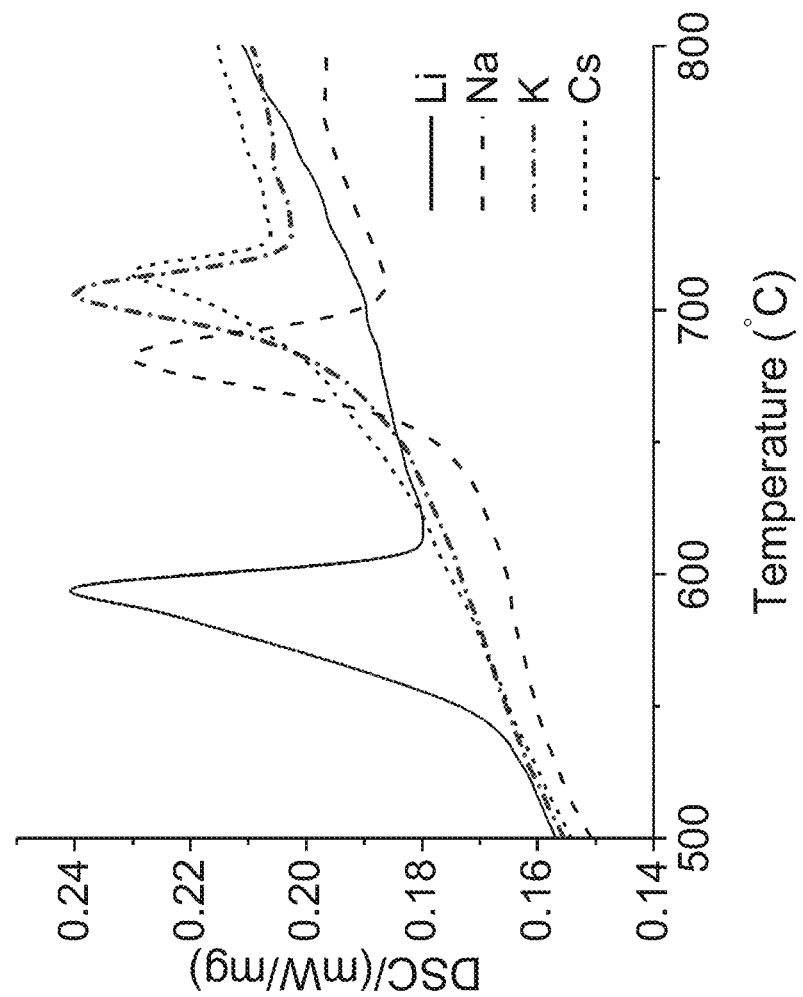
FIG. 3 is a plot of differential scanning calorimetry cooling curves measured for glass ceramic samples.

Different alkali metal oxides cause the crystalline $M_xWO_3$ phase to precipitate at different rates. For melts having the same batched composition but with different alkali metal oxides $R_2O$ (where R=Li, Na, K, or Cs) the $M_xWO_3$ precipitation rate is slowest when M (or R) is Cs, and fastest when M (or R) is Li—i.e., Cs<K<Na<Li (e.g., samples 14, 15, 16, and 13 in Table 1). The temperature at which the crystalline $M_xWO_3$ phase forms in the glass ceramic also shifts depending on the alkali metal that is present. FIG. 3 shows differential scanning calorimetry (DSC) cooling curves measured for samples 14, 15, 16, and 13, the compositions of which are listed Table 1. As seen in FIG. 3 and Table A below, the cesium-containing melt crystallizes at the highest temperature, followed by the potassium-containing, sodium-containing, and lithium-containing melts.

TABLE A

Crystallization temperatures for crystalline $M_xWO_3$ phases.

| Sample | Alkali metal M | Crystallization Temperature (° C.) |
|---|---|---|
| 14 | Li | 593.8 |
| 15 | Na | 682.2 |
| 16 | K | 706.3 |
| 13 | Cs | 714.1 |

Figure 4:
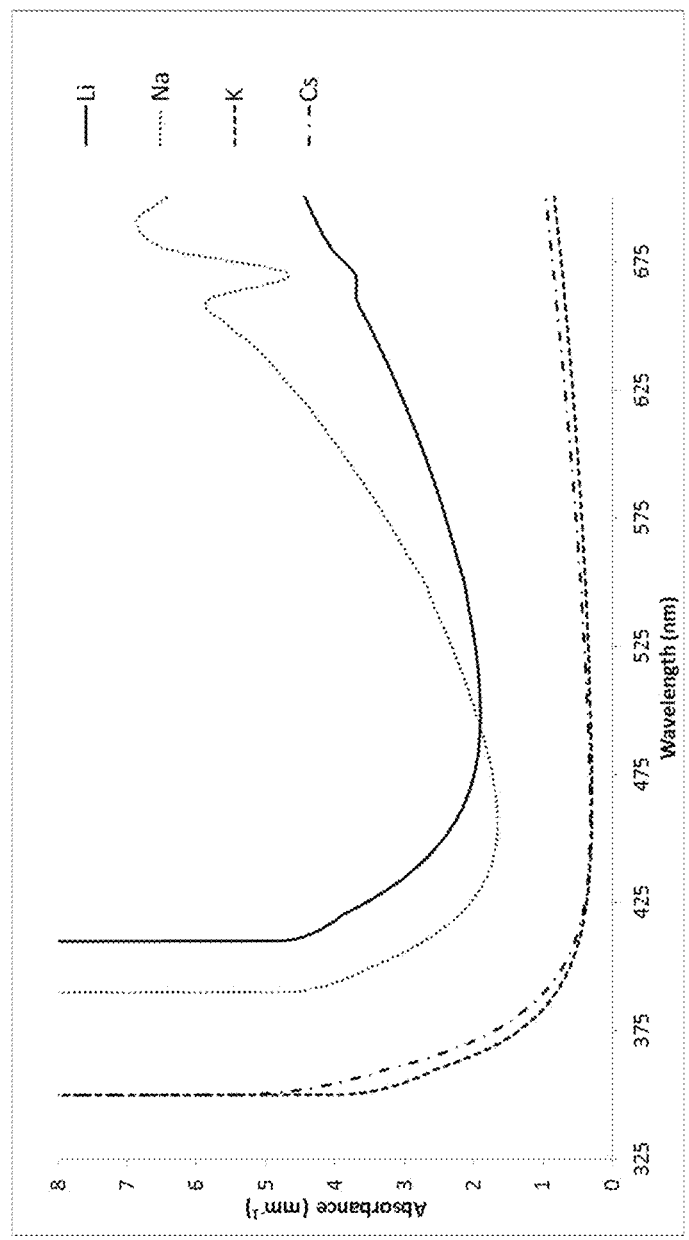
FIG. 4 is a plot of spectra of glass ceramics containing different alkali tungsten bronzes.

The peak or maximum transmission wavelength in the visible range and NIR absorption edge of the glass ceramic may be tuned through composition, heat treatment time and temperature, and alkali metal oxide selection. Spectra of glass ceramics containing different alkali tungsten bronzes and otherwise having identical compositions (samples 14, 15, 16, and 13 in Table 1) are shown in FIG. 4. The potassium and cesium analogs (samples 16 and 13, respectively) and have shorter peak visible transmittance wavelengths (440-450 nm) than the sodium and lithium analogs (samples 15 and 14, respectively), which have peak visible transmittance wavelengths of 460 nm and 510 nm, respectively.

In some embodiments (e.g., examples 37, 44, 46, and 50 in Table 1), the glass ceramics described herein have a lower boron concentration—i.e., from about 9.8 mol % to about 11.4 mol % $B_2O_3$ (9.8 mol % ≤ $B_2O_3$ ≤ 11.4 mol %). In these samples, the NIR-absorbing crystalline $M_xWO_3$ phase is precipitated over a narrow and low temperature range, as shown in Table B. These compositions may be heated above their respective softening points and sagged, slumped, or formed, without growing the crystalline $M_xWO_3$ phase. This allows the optical performance of these glass ceramics to be controlled and tailored by first forming and/or shaping the glass article and then subsequently heat-treating the material at a low temperature to precipitate the NIR-absorbing crystalline $M_xWO_3$ second phase. In addition, the crystalline $M_xWO_3$ second phase in glass ceramics having the above compositions may be "erased" (and the glass ceramic "bleached") by heating the glasses for a short period above their respective softening points. Composition 44, for example, can be bleached by holding the material at a temperature between about 685° C. and about 740° C. for approximately 5 minutes.

TABLE B

Crystallization temperature ranges for crystalline $M_xWO_3$ phases in samples having low $B_2O_3$ content.

| Sample | $B_2O_3$ (mol %) | Crystallization Temperature Range (° C.) |
|---|---|---|
| 37 | 10 | 575-625 |
| 44 | 10.4 | 500-550 |
| 46 | 9.8 | 500-575 |
| 50 | 11.4 | 500-650 |

In some embodiments, these glasses and glass ceramics may be patterned with UV lasers. The $M_xWO_3$ phase may be precipitated in rapidly quenched compositions (e.g., sample 14 in Table 1), for example, by exposing the material exposed to a 10 watt 355 nm pulsed laser.

Figure 5:
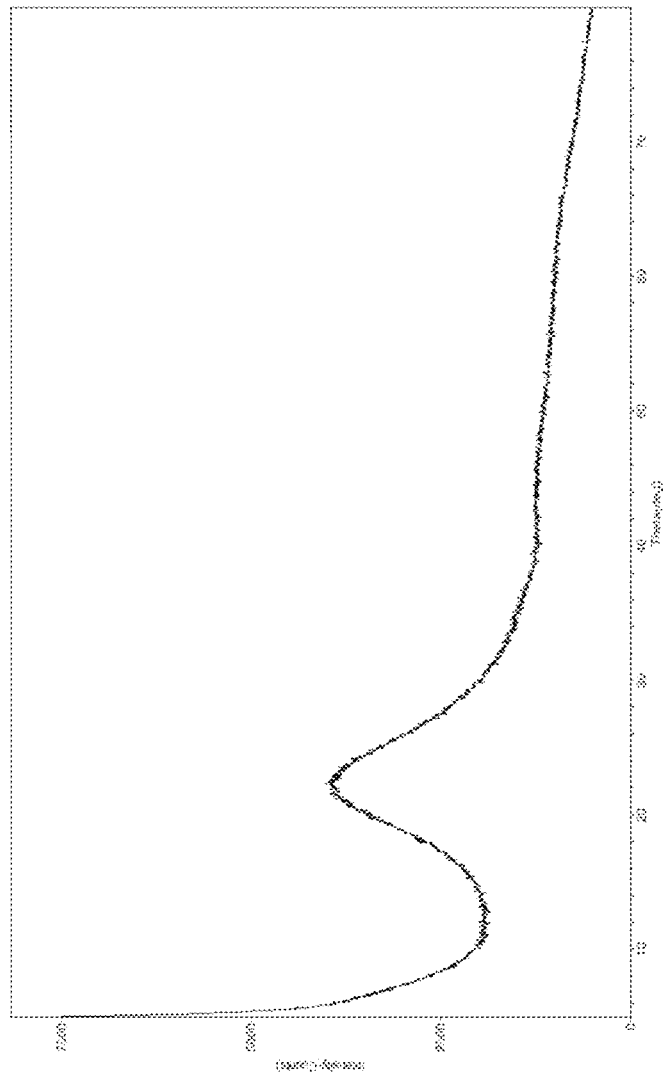
FIG. 5 is an x-ray powder diffraction profile of a splat-quenched glass ceramic.
Figure 6:
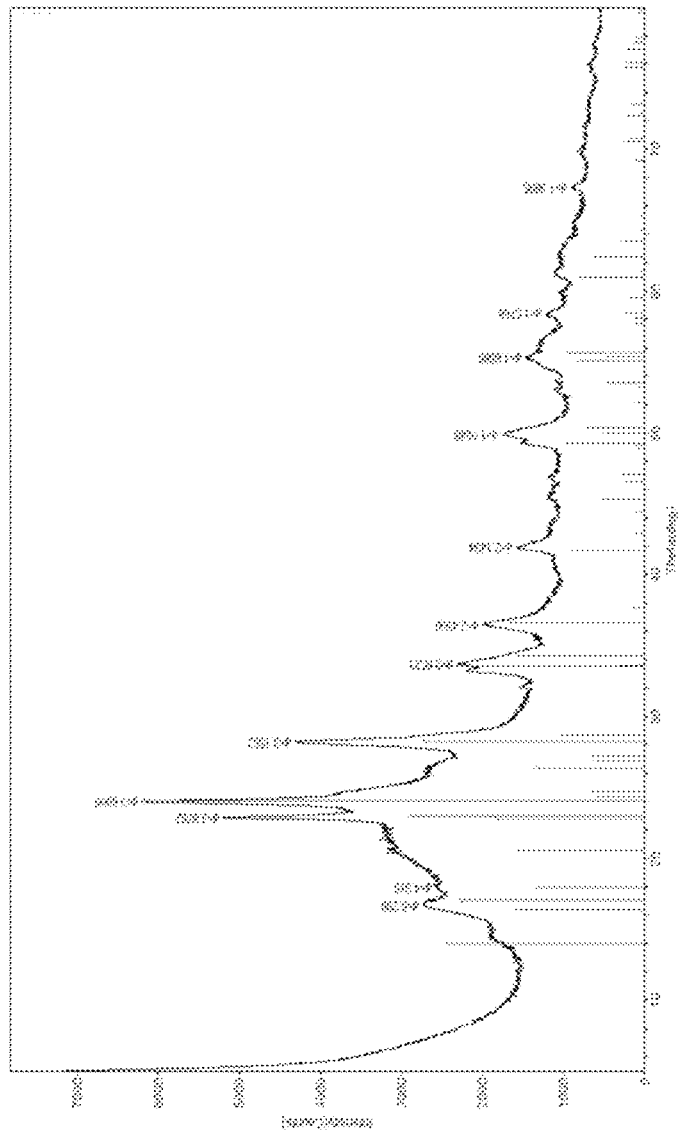
FIG. 6 is an x-ray powder diffraction profile of a heat-treated glass ceramic.

Table C lists physical properties, including strain, anneal and softening points, coefficients of thermal expansion (CTE), density, refractive indices, Poisson's ratio, shear modulus, Young's modulus, liquidus (maximum crystallization) temperature, and the stress optical coefficient (SOC) measured for selected sample compositions listed in Table 1. In addition, x-ray powder diffraction (XRD) profiles of splat-quenched and heat-treated glass ceramic compositions were obtained for selected samples listed in Table 1. FIGS. 5 and 6 are representative XRD profiles obtained for splat-quenched and heat-treated materials, both having composition 14 in Table 1, respectively. These XRD profiles demonstrate that as-quenched materials (FIG. 5) are amorphous and do not contain a crystalline $M_xWO_3$ phase prior to heat treatment, and heat-treated glass materials contain a crystalline $M_xWO_3$ second phase.

TABLE C

Physical properties measured for glass ceramics having compositions selected from Table 1.

| Properties | 2 | 11 | 12 | 13 | 14 | 15 | 16 |
|---|---|---|---|---|---|---|---|
| Strain Pt. (° C.) | 495 | 450 | 461 | 505.8 | 512.1 | 497.4 | 497.3 |
| Anneal Pt. (° C.) | 557 | 498 | 513 | 566.1 | 563.1 | 552.2 | 553.7 |
| Soft Pt. PPV (° C.) | 963.1 | 850.9 | 837.9 | 952.4 | | | |
| CTE (×$10^{-7}$/° C.) | 33.5 | 53.2 | 48.6 | 37 | | | |
| Density (g/cm$^3$) | 2.335 | 2.612 | 2.569 | 2.516 | 2.427 | 2.402 | 2.392 |
| Refractive Index 633 nm | | | 1.4944 | 1.4997 | | | |
| Refractive Index 1549 nm | | | 1.4798 | 1.4835 | | | |

| Properties | 33 | 34 | 35 | 36 | 45 | 46 | 50 |
|---|---|---|---|---|---|---|---|
| Strain Pt. (° C.) | 515.1 | 471.2 | 485.2 | 523.9 | 486.8 | 483 | 471.3 |
| Anneal Pt. (° C.) | 568.9 | 514.3 | 530.8 | 573.1 | 540.8 | 536.7 | 521.2 |
| Soft Pt. PPV (° C.) | | 725.6 | 769.6 | 857.9 | 831.5 | 822.2 | 797.3 |
| CTE (×$10^{-7}$/° C.) | | | | | | | |
| Density (g/cm$^3$): | 2.307 | 2.416 | 2.429 | 2.452 | | | |
| Refractive Index 633 nm | | | | | | | |
| Refractive Index 1549 nm | | | | | | | |
| Poisson's Ratio | 0.228 | 0.23 | 0.226 | 0.217 | | | |
| Shear Modulus Mpsi | 3.47 | 3.48 | 3.65 | 3.95 | | | |
| Young's Modulus Mpsi | 8.53 | 8.56 | 8.96 | 9.61 | | | |
| Stress Optical Coefficient nm/nm/MPa | | 4.176 | 4.033 | 3.763 | | | |
| Maximum Crystallization Temp (° C.) | >1320 | 1160 | 1175 | 1290 | 1210 | 1210 | 1155 |

TABLE C-continued

Physical properties measured for glass ceramics having compositions selected from Table 1.

| Primary Phase Comments | Unknown Devitrified to hot end | Unknown Cassiterite up to 1155° C. | Mullite Cassiterite up to 1170° C. | Mullite | Cassiterite | Cassiterite | Cassiterite |
|---|---|---|---|---|---|---|---|
| | | | Properties | 51 | 52 | 53 | 54 |
| | | | Strain Pt. (° C.) | 489.7 | 466.5 | | |
| | | | Anneal Pt. (° C.) | 544.4 | 522.3 | | |
| | | | Soft Pt. PPV (° C.) | | | | |
| | | | CTE ($\times 10^{-7}$/° C.) | 64.4 | 57.3 | | |
| | | | Density (g/cm$^3$): | | | | |
| | | | Refractive Index 633 nm | | | | |
| | | | Refractive Index 1549 nm | | | | |
| | | | Poisson's Ratio | 0.219 | 0.219 | 0.219 | 0.214 |
| | | | Shear Modulus Mpsi | 0.217 | 3.79 | 3.88 | 3.55 |
| | | | Young's Modulus Mpsi | 8.60 | 9.25 | 9.47 | 8.62 |
| | | | Stress Optical Coefficient nm/nm/MPa | 3.838 | 3.628 | 3.65 | 3.81 |
| | | | Maximum Crystallization Temp (° C.) | | | | |
| | | | Primary Phase Comments | | | | |

In those embodiments in which the glass ceramic comprises alumina ($Al_2O_3$) and at least one alkali metal, the glass ceramic may be ion exchangeable. Ion exchange is commonly used to chemically strengthen glasses. In one particular example, alkali cations within a source of such cations (e.g., a molten salt, or "ion exchange," bath) are exchanged with smaller alkali cations within the glass to achieve a layer under a compressive stress (CS) extending from the surface, where CS is the maximum, of the glass to a depth of layer (DOL) or depth of compression DOC within the glass phase. For example, potassium ions from the cation source are often exchanged with sodium ions within the glass phase.

In some embodiments, the glass ceramic is ion exchanged and has a compressive layer extending from at least one surface to a depth (as indicated by DOC and/or DOL) of at least about 10 μm within the glass ceramic. The compressive layer has a compressive stress CS of at least about 100 MPa and less than about 1500 MPa at the surface.

In non-limiting examples, compositions 51 and 54 were ion exchanged. The samples were first heat-treated at 550° C. for 15 hours, then cooled at 1° C./min to 475° C., and further cooled to room temperature at the rate of cooling of the furnace when power is shut off (furnace rate). The cerammed samples were then ion exchanged at 390° C. for 3 hours in a molten bath of $KNO_3$ resulting in surface compressive stresses of 360 MPa and 380 MPa and depths of layers of 31 and 34 microns for glass-ceramic compositions 51 and 54, respectively.

In one embodiment, the glass ceramics described herein may be made using a melt quench process. Appropriate ratios of the constituents may be mixed and blended by turbulent mixing or ball milling. The batched material is then melted at temperatures ranging from about 1550° C. to about 1650° C. and held at temperature for times ranging from about 6 to about 12 hours, after which time it may be cast or formed and then annealed. Depending on the composition of the material, additional heat treatments at or slightly above the annealing point, but below the softening point, to develop the crystalline $M_xWO_3$ second phase and provide UV- and NIR-absorbing properties. Optimal UV- and NIR-absorbing properties have been obtained with compositions of samples 12-16, 37, 46, 50-53 and 61 in Table 1. Heat-treatment times and temperature ranges used to develop the crystalline $M_xWO_3$ second phase for exemplary compositions are listed in Table D.

TABLE D

Heat Treatment temperature and time ranges used to produce UV- and NIR- absorbing $M_xWO_3$ glass ceramics via the melt-quench process.

| Composition (Table 1) | Heat Treatment Temperature Range (° C.) | Heat Treatment Time Range (hours) |
|---|---|---|
| 12 | 520-550 | 20-30 |
| 13 | 650-725 | 0.5-1.5 |
| 14 | 575-700 | 0.08-0.5 |
| 15 | 625-725 | 0.4-2 |
| 16 | 650-725 | 0.5-2 |
| 37 | 600-625 | 16-30 |
| 46 | 525-600 | 0.75-10 |
| 50 | 525-650 | 0.75-10 |
| 51 | 525-600 | 0.75-10 |
| 52 | 525-575 | 1-10 |
| 53 | 525-575 | 0.5-5 |
| 61 | 525-650 | 0.2-2 |

Figure 7:
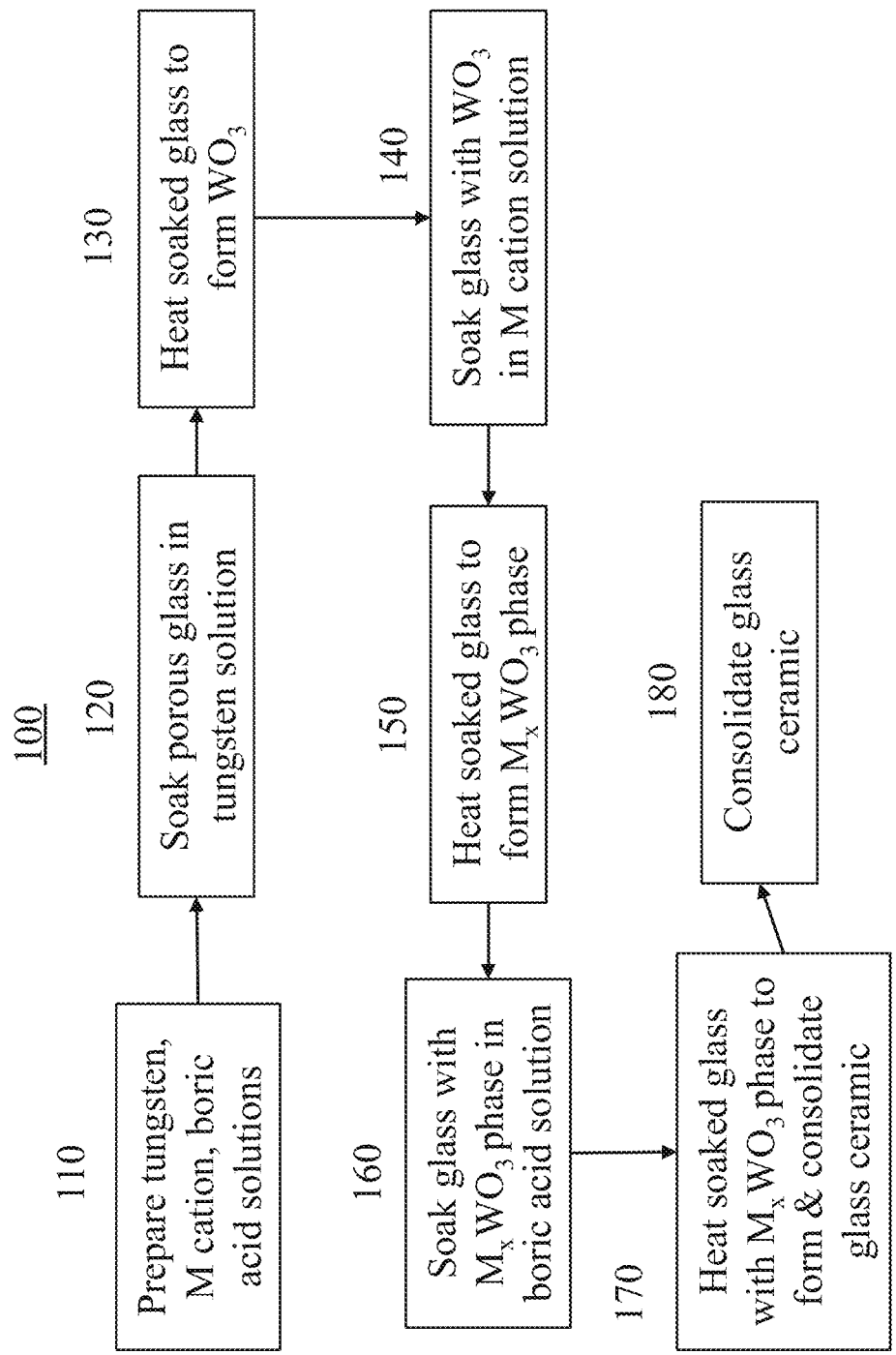
FIG. 7 is a flow chart for a method of infiltrating a glass to form a glass ceramic.

In other embodiments, the glass ceramic is formed by infiltrating a nano-porous glass such as, but not limited to, VYCOR®, a high-silica glass manufactured by Corning Incorporated. Such nano-porous glasses may be 20 to 30% porous with a 4.5-16.5 nm average pore diameter, with a narrow pore size distribution (with about 96% of the pores in the glass being ±0.6 nm from the average diameter). The average pore diameter may be increased to about 16.5 nm by adjusting the heat treatment schedule required to phase separate the glass and by modifying etching conditions. A flow chart for the method of infiltrating a glass and forming the glass ceramic is shown in FIG. 7.

In step 110 of method 100, a first solution containing tungsten, a second solution containing the metal cation M, and a third solution of boric acid are prepared or provided to deliver these components to a nano-porous glass substrate. In one embodiment, the tungsten solution is prepared by dissolving ammonium metatungstate (AMT) in deionized water to produce a desired concentration of tungsten ions. In some embodiments, organic precursors, such as tungsten carbonyl, tungsten hexachloride, or the like may be used to deliver the tungsten into the pores of the nano-porous glass substrate. A number of aqueous precursors, including nitrates, sulfates, carbonates, chlorides, or the like may also be used to provide the metal M cation in the $M_xWO_3$ bronze.

In one non-limiting example, a first aqueous solution of 0.068 M AMT and a second aqueous solution 0.272 M of cesium nitrate are prepared or provided such that the cesium cation concentration is ⅓ of the tungsten cation concentration.

The third solution is a super-saturated boric acid solution which, in some embodiments, may be prepared by adding boric acid hydrate to deionized water, and heating the mixture to boiling while stirring.

In some embodiments (not shown in FIG. 7), the nano-porous glass may be cleaned prior to forming the glass ceramic. Samples (e.g., 1 mm sheets) of glass may first be slowly heated in ambient air to a temperature of about 550° C. to remove moisture and organic contaminants, and subsequently kept stored at about 150° C. until ready for use.

The nano-porous glass is first infiltrated with the tungsten solution (step 120) by immersing the glass in the first, tungsten-containing solution at room temperature (about 25° C.). In one non-limiting example, the nano-porous glass is immersed in the first solution for about one hour. The glass sample may then be removed from the first solution, soaked for about one minute in deionized water, and dried in ambient air for times ranging from about 24 to about 72 hours.

In the next step of method 100, the infiltrated nano-porous glass sample is heated in flowing oxygen to decompose the ammonium tungsten metatungstate and form $WO_3$ (step 130). The glass is first heated to about 225° C. at a rate of about 1° C./minute, then heated from about 225° C. to about 450° C. at a rate of 2.5° C./minute followed by a four hour hold at 450° C., and then cooled from about 450° C. to room temperature at a rate in a range from about 5° C. to about 7° C. per minute. Step 130 may, in some embodiments, include pre-heating the glass at about 80° C. for up to about 24 hours prior to the above heat treatment.

Following step 130, the glass is immersed in the second solution (step 140) at room temperature (about 25° C.) to infiltrate the glass with the M cation solution. Step 140 may, in some embodiments, be preceded by pre-heating the glass at about 80° C. for up to about 24 hours prior to immersion. In one non-limiting example, the nano-porous glass is immersed in the second solution for about one hour. The glass sample may then be removed from the second solution, soaked for about one minute in deionized water, and dried in ambient air for times ranging from about 24 to about 72 hours.

Following step 140, the nano-porous glass sample is heated to form the crystalline tungsten bronze $M_xWO_3$ phase (step 150). Heating step 150 includes first heating the glass from about 5° C. to about 200° C. at a rate (ramp rate) of about 1° C./minute in a nitrogen atmosphere, followed by heating from about 200° C. to about 575° C. at a rate of about 3° C./minute under an atmosphere of 3% hydrogen and 97% nitrogen and a one hour hold at 575° C., and then rapidly cooling the glass to about 300° C. by opening the furnace in which the heating step takes place. In some embodiments, the sample is then left to stand in ambient air for an unspecified time.

Following step 150, the glass sample is immersed in the third solution, which is a supersaturated boric acid solution (step 160). The third solution is maintained at boiling and gently stirred during step 160. In some embodiments, the glass sample is immersed in the boiling solution for about 30 minutes. After removal from the third solution the sample, in some embodiments, is washed with deionized water and left to stand in ambient air for about 24 hours. The glass is then heated under a nitrogen atmosphere to form and consolidate the glass ceramic (step 170). The glass is first heated from room temperature to about 225° C. at a ramp rate of about 1° C./minute in step 170, followed by heating from about 225° C. to about 800° C. at a rate of about 5° C./minute. The glass is held at 800° C. for about one hour and then cooled from about 800° C. to room temperature at a rate of about 10° C./minute.

In another aspect, glasses doped with rare earth oxides (REO) and having high absorbance in the NIR region of the spectrum are provided. In some embodiments, these REO-doped glasses contribute to high refractive index of the glass in the infrared (IR). The rare earth oxide dopants, which include $Sm_2O_3$, $Pr_2O_3$, and $Er_2O_3$, comprise up to about 30 mol % of the glass.

Figure 8:
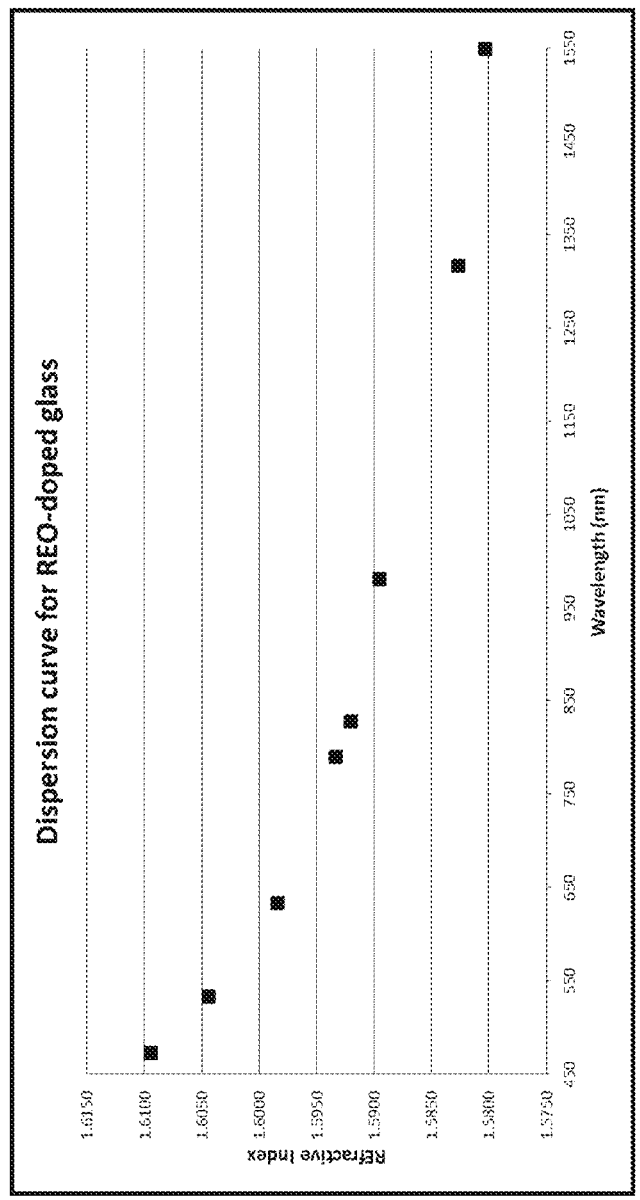
FIG. 8 is a plot of a dispersion curve for glass E listed in Table E.
Figure 9:
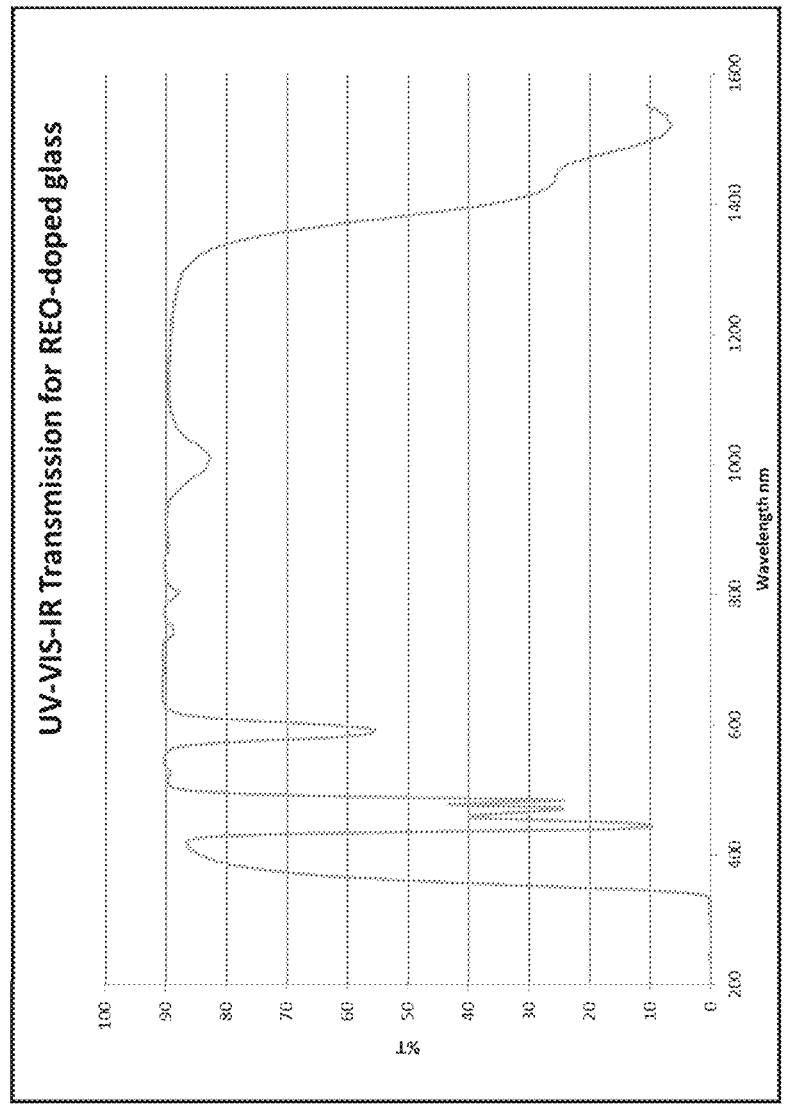
FIG. 9 is a plot of transmission for glass E listed in Table E.
Figure 10:
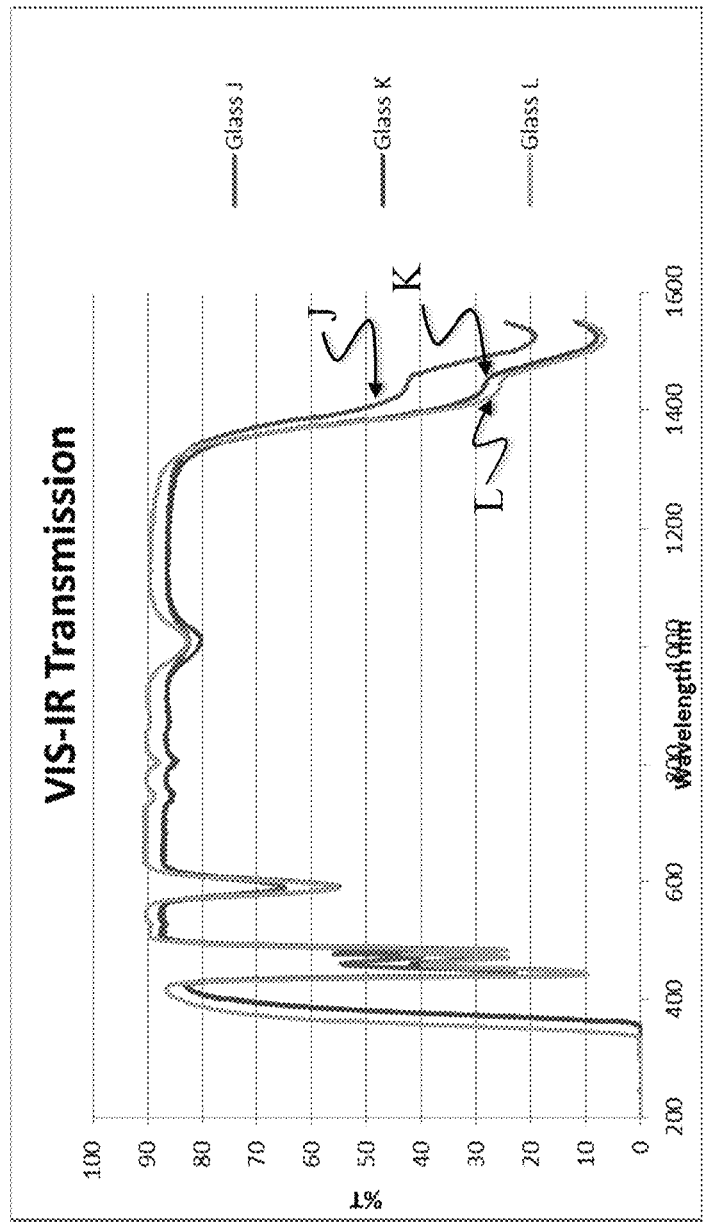
FIG. 10 is a plot of transmission for glasses J, K, and L listed in Table F.

In some embodiments, the REO-doped glasses are aluminosilicate glasses comprising $Al_2O_3$ and $SiO_2$ and at least one of $Sm_2O_3$, $Pr_2O_3$, and $Er_2O_3$, where $Sm_2O_3+Pr_2O_3+Er_2O_3 \leq 30$ mol %, in some embodiments, $Sm_2O_3+Pr_2O_3+Er_2O_3 \leq 28$ mol % and, in other embodiments, $Sm_2O_3+Pr_2O_3+Er_2O_3 \leq 25$ mol %. In some embodiments, these REO-doped glasses may comprise up to about 30 mol % $Pr_2O_3$ or up to about 25 mol % $Pr_2O_3$. In other embodiments, these REO-doped glasses may comprise up to 28 mol % $Sm_2O_3$ or up to 26 mol % $Sm_2O_3$. The REO-doped aluminosilicate glasses may comprise from about 40 mol % to about 72 mol % $SiO_2$ (40 mol % $\leq SiO_2 \leq 72$ mol %) or from about 50 mol % to about 72 mol % $SiO_2$ (50 mol % $\leq SiO_2 \leq 72$ mol %) and from about 8 mol % to about 45 mol % $Al_2O_3$ (8 mol % $\leq Al_2O_3 \leq 45$ mol %), or from about 8 mol % to about 20 mol % $Al_2O_3$ (8 mol % $\leq Al_2O_3 \leq 20$ mol %) or from about 8 mol % to about 18 mol % $Al_2O_3$ (8 mol % $\leq Al_2O_3 \leq 18$ mol %). In some embodiments, the glasses further comprise at least one alkaline earth oxide and/or $B_2O_3$, where 0 mol % $\leq MgO+CaO+BaO \leq 24$ mol % and 0 mol % $\leq B_2O_3 \leq 6$ mol %. The glasses, in some embodiments, have less than about 30% transmission at a wavelength between about 1400 nm and about 1600 nm. Non-limiting examples of compositions of aluminosilicate glasses are listed in Table E. Refractive indices (RI) measured for these glasses are also listed in Table E. Glasses A, B and C, which contain no alkaline earth modifiers, were found to be too viscous to pour, even at 1650° C. Glasses E and F, which contain appreciable amounts (>21 mol %) of alkaline earth modifiers, as well as $B_2O_3$ are pourable at 1650° C. Dispersion and percent transmittance for Glass E for both the visible and NIR regions of the spectrum are plotted in FIGS. 8 and 9, respectively. Glass E exhibits both a high refractive index in the infrared (IR) region and high absorbance at 1550 nm. UV-VIS-IR spectra of these compositions containing 3-5 mol % $Pr_2O_3$ are plotted in FIG. 10, and show the high absorbance of these glasses at 1550 nm.

TABLE E

Compositions and refractive indices of rare earth-doped aluminosilicate glasses.

| Mol % | A | B | C | D | E | F |
|---|---|---|---|---|---|---|
| MgO | 0 | 0 | 0 | 9.2 | 8.8 | 8.8 |
| CaO | 0 | 0 | 0 | 9.2 | 8.8 | 8.8 |
| BaO | 0 | 6 | 6 | 3.4 | 3.2 | 3.2 |
| $Al_2O_3$ | 18 | 18 | 18 | 10.7 | 10.2 | 10.2 |
| $B_2O_3$ | 0 | 0 | 0 | 4.6 | 4.4 | 4.4 |
| $SiO_2$ | 70 | 70 | 70 | 62.9 | 59.9 | 59.9 |
| $Pr_2O_3$ | 12 | 6 | 0 | 0 | 4.8 | 0.0 |
| $Sm_2O_3$ | 0 | 0 | 6 | 0 | 0 | 4.8 |
| RI at 1550 nm | 1.604 | 1.565 | 1.562 | 1.528 | 1.58 | 1.576 |

| Mol % | E-1 | E-2 | E-3 | E-4 |
|---|---|---|---|---|
| MgO | 8.4 | 8.0 | 7.7 | 7.4 |
| CaO | 8.4 | 8.0 | 7.7 | 7.4 |
| BaO | 3.1 | 3.0 | 2.8 | 2.7 |
| $Al_2O_3$ | 9.7 | 9.3 | 8.9 | 8.6 |
| $B_2O_3$ | 4.2 | 4.0 | 3.8 | 3.7 |
| $SiO_2$ | 57.2 | 54.7 | 52.4 | 50.3 |
| $Pr_2O_3$ | 9.1 | 13.0 | 16.7 | 20.0 |
| $Sm_2O_3$ | 0 | 0 | 0 | 0 |

| Mol % | DP | DQ | DR | DT | DU | DW | EC |
|---|---|---|---|---|---|---|---|
| $Pr_2O_3$ | 0 | 0 | 0 | 0 | 0 | 0 | 0 |
| $Sm_2O_3$ | 20 | 22 | 18 | 22 | 18 | 22 | 0 |
| $Er_2O_3$ | 0 | 0 | 0 | 0 | 0 | 0 | 20 |
| $Al_2O_3$ | 16 | 18 | 22 | 22 | 26 | 26 | 18 |
| $SiO_2$ | 64 | 60 | 60 | 56 | 56 | 52 | 62 |

| Mol % | ED | ES | FA | FB | FC | FD | FE |
|---|---|---|---|---|---|---|---|
| $Pr_2O_3$ | 0 | 0 | 20 | 20 | 20 | 26 | 28 |
| $Sm_2O_3$ | 0 | 26 | 0 | 0 | 0 | 0 | 0 |
| $Er_2O_3$ | 22 | 0 | 0 | 0 | 0 | 0 | 0 |
| $Al_2O_3$ | 24 | 22 | 20 | 30 | 40 | 20 | 28 |
| $SiO_2$ | 54 | 52 | 60 | 50 | 40 | 54 | 44 |

In some embodiments, the REO-doped glasses are zinc-bismuth-borate glasses comprising ZnO, $Bi_2O_3$, $B_2O_3$, and at least one of $Sm_2O_3$, $Pr_2O_3$, and $Er_2O_3$, where $Sm_2O_3+Pr_2O_3+Er_2O_3 \leq 10$ mol % or, in other embodiments, $Sm_2O_3+Pr_2O_3+Er_2O_3 \leq 5$ mol %. In some embodiments, these REO-doped glasses may comprise up to about 10 mol % $Pr_2O_3$. In other embodiments, these REO-doped glasses may comprise up to 10 mol % $Sm_2O_3$. The REO-doped Zn—Bi-borate glasses may comprise from about 20 mol % to about 30 mol % ZnO (20 mol % $\leq$ ZnO $\leq$ 30 mol %), from about 4 mol % to about 20 mol % $Bi_2O_3$ (4 mol % $\leq Bi_2O_3 \leq$ 20 mol %), and from about 40 mol % to about 50 mol % $B_2O_3$ (40 mol % $\leq B_2O_3 \leq$ 50 mol %). In some embodiments, the REO-doped Zn—Bi-borate glasses further comprise at least one of $Na_2O$ and $TeO_2$, where 0 mol % $\leq TeO_2 \leq$ 6 mol % and 0 mol % $\leq Na_2O \leq$ 15 mol %. The glasses, in some embodiments, have less than about 30% transmission at a wavelength between about 1400 nm and about 1600 nm. Non-limiting examples of compositions of Zn—Bi-borate glasses are listed in Table F. Refractive indices (RI) measured for these glasses are also listed in Table F.

TABLE F

Compositions of rare earth-doped Zn-Bi-borate glasses.

| Mol % | G | H | I | J | K | L |
|---|---|---|---|---|---|---|
| ZnO | 26.2 | 26.2 | 28.5 | 21.7 | 21.2 | 25.7 |
| $Bi_2O_3$ | 4.9 | 4.9 | 19 | 14.6 | 14.3 | 4.8 |
| $B_2O_3$ | 43.6 | 43.6 | 47.5 | 41.5 | 40.7 | 42.9 |
| $TeO_2$ | 5.8 | 5.8 | 0 | 0.0 | 0.0 | 5.7 |
| $Na_2O$ | 14.1 | 14.1 | 0 | 9.7 | 9.5 | 13.8 |
| BaO | 2.4 | 2.4 | 0 | 9.7 | 9.5 | 2.4 |
| $Pr_2O_3$ | 3 | 0 | 5 | 2.9 | 4.8 | 4.8 |
| $Sm_2O_3$ | 0 | 3 | 0 | 0 | 0.0 | 0.0 |
| RI at 1550 nm | 1.683 | 1.680 | 1.857 | not. measured | not. measured | not. measured |

In other embodiments, the REO-doped glasses described herein are phosphate or aluminophosphate glasses. Rare earth metaphosphates having a molar ratio $25Ln_2O_3:75P_2O_5$, where Ln represents the rare earth elements, form glasses having reasonable durability. Durability may be further improved by including $Al_2O_3$ in the glass. REO-doped aluminophosphate glasses, in some embodiments, may comprise from about 6 mol % to about 25% $Ln_2O_3$ (6 mol % $\leq Ln_2O_3 \leq$ 22.5 mol %), where Ln=$Sm_2O_3+Pr_2O_3+Er_2O_3$, from about 5 mol % to about 27% $Al_2O_3$ (5 mol % $\leq Al_2O_3 \leq$ 27 mol %), and from about 67 mol % to about 74 mol % $P_2O_5$ (67 mol % $\leq P_2O_5 \leq$ 67 mol %). In certain embodiments, such glasses comprise from about 6 mol % to about 22.5% $Sm_2O_3$ (6 mol % $\leq Sm_2O_3 \leq$ 22.5 mol %), from about 5 mol % to about 27% $Al_2O_3$ (5 mol % $\leq Al_2O_3 \leq$ 27 mol %), and from about 67 mol % to about 74 mol % $P_2O_5$ (67 mol % $\leq P_2O_5 \leq$ 67 mol %). Non-limiting examples of compositions of samarium-doped aluminophosphate glasses are listed in Table G.

TABLE G

Compositions of rare earth-doped aluminophosphate glasses.

| Mol % | M | N | O | P | Q | R | S |
|---|---|---|---|---|---|---|---|
| $Sm_2O_3$ | 21 | 17 | 20 | 13.5 | 10 | 13 | 6 |
| $Al_2O_3$ | 5 | 10 | 10 | 15 | 20 | 20 | 25 |
| $P_2O_5$ | 74 | 73 | 70 | 71.5 | 70 | 67 | 69 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass comprising, comprising:
   56 mol % $\leq SiO_2 \leq$ 78 mol %;
   8 mol % $\leq B_2O_3 \leq$ 27 mol %;
   0.5 mol % $\leq Al_2O_3 \leq$ 14 mol %;
   1 mol % $\leq WO_3 \leq$ 10 mol %; and
   $R_2O$ in mol % such that $-10$ mol % $\leq (R_2O - Al_2O_3) \leq 0.1$ mol %, where $R_2O$ is at least one of $Na_2O$, $K_2O$, $Cs_2O$, and/or $Rb_2O$.

2. The glass of claim 1, more specifically comprising 60 mol % $\leq SiO_2 \leq$ 78 mol %.

3. The glass of claim 1, more specifically comprising 1 mol % $\leq WO_3 \leq$ 5 mol %.

4. The glass of claim 1, further comprising 0 mol % $\leq SnO_2 \leq$ 0.5 mol %.

5. The glass of claim 1, further comprising 0 mol % $< Li_2O \leq$ 9 mol %.

6. The glass of claim 1, further comprising 0 mol %<Na$_2$O≤9 mol %.

7. The glass of claim 1, further comprising 0 mol %<K$_2$O≤9 mol %.

8. The glass of claim 1, further comprising 0 mol %<Cs$_2$O≤10 mol %.

9. The glass of claim 1, further comprising 0 mol %<Rb$_2$O≤9 mol %.

10. The glass of claim 1, more specifically comprising 9.8 mol %≤B$_2$O$_3$≤11.4 mol %.

11. The glass of claim 1, further comprising at least one of:

0 mol %≤MgO≤0.5 mol %;
0 mol %≤P$_2$O$_5$≤2 mol %; and/or
0 mol %≤ZnO≤1 mol %.

12. The glass of claim 1, wherein, in mol %, 0<(Na$_2$O+K$_2$O+Cs$_2$O+Rb$_2$O)≤9.

13. The glass of claim 1, wherein, in mol %, 0≤(R$_2$O/WO$_3$)≤4.

14. The glass of claim 1, wherein, in mol %, 1≤[(R$_2$O+Al$_2$O$_3$)/WO$_3$]≤6.

* * * * *

UNITED STATES PATENT AND TRADEMARK OFFICE
CERTIFICATE OF CORRECTION

PATENT NO. : 11,629,091 B2  
APPLICATION NO. : 17/539507  
DATED : April 18, 2023  
INVENTOR(S) : Matthew John Dejneka et al.

Page 1 of 1

It is certified that error appears in the above-identified patent and that said Letters Patent is hereby corrected as shown below:

On the Title Page

In item (56), in Column 2, under "Other Publications", Line 5, delete "Nanopartice" and insert -- Nanoparticle --.

On the second page, in item (56), in Column 2, under "Other Publications", Line 10, delete "Oxude"," and insert -- Oxide", --.

On the third page, in item (56), in Column 1, under "Other Publications", Line 18, delete "6(5." and insert -- 6(5). --.

On the third page, in item (56), in Column 1, under "Other Publications", Line 38, delete "shielding bility" and insert -- shielding ability --.

Signed and Sealed this  
Twenty-fifth Day of July, 2023

Katherine Kelly Vidal  
*Director of the United States Patent and Trademark Office*